(12) United States Patent
Tanabe

(10) Patent No.: US 11,794,616 B2
(45) Date of Patent: Oct. 24, 2023

(54) CONVEYANCE SEAT

(71) Applicant: TS TECH CO., LTD., Asaka (JP)

(72) Inventor: Jinichi Tanabe, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 129 days.

(21) Appl. No.: 17/441,590

(22) PCT Filed: Mar. 19, 2020

(86) PCT No.: PCT/JP2020/012260
§ 371 (c)(1),
(2) Date: Sep. 21, 2021

(87) PCT Pub. No.: WO2020/196242
PCT Pub. Date: Oct. 1, 2020

(65) Prior Publication Data
US 2022/0194273 A1    Jun. 23, 2022

(30) Foreign Application Priority Data

Mar. 22, 2019  (JP) ................. 2019-055602
Mar. 22, 2019  (JP) ................. 2019-055603
Apr. 26, 2019  (JP) ................. 2019-086748

(51) Int. Cl.
*B60N 2/42* (2006.01)
*B60N 2/427* (2006.01)

(52) U.S. Cl.
CPC ....... *B60N 2/4228* (2013.01); *B60N 2/42745* (2013.01)

(58) Field of Classification Search
CPC .................. B60N 2/4228; B60N 4/42745
See application file for complete search history.

(56) References Cited

U.S. PATENT DOCUMENTS

| | | |
|---|---|---|
| 5,040,848 A | 8/1991 | Hideki et al. |
| 2005/0093352 A1 | 5/2005 | Yasuda et al. |
| 2011/0241394 A1 | 10/2011 | Yamaguchi et al. |

FOREIGN PATENT DOCUMENTS

| | | |
|---|---|---|
| JP | H 02-149545 U | 12/1990 |
| JP | H 06-500936 A | 2/1994 |
| JP | 2005-126053 A | 5/2005 |
| JP | 2010-018214 A | 1/2010 |

(Continued)

OTHER PUBLICATIONS

International Search Report and Written Opinion with English Translation issued in PCT/JP2020/012260, dated Apr. 28, 2020 (12 pages).

*Primary Examiner* — Anthony D Barfield
(74) *Attorney, Agent, or Firm* — Dority & Manning, P.A.

(57) ABSTRACT

Provided is a conveyance seat that effectively reduces a load to be applied to an occupant at the time of a vehicle collision. A conveyance seat includes a seat back and a headrest. The seat back includes a chest support member inside the seat back, which receives a chest of an occupant to support the chest of the occupant when a backward movement load is applied to the occupant because of a vehicle collision. The headrest includes a head support member inside the headrest, which receives a head of the occupant to support the head of the occupant when the backward movement load is applied to the occupant. When the backward movement load is applied to the occupant, both the chest support member and the head support member receive the backward movement load.

15 Claims, 27 Drawing Sheets

(56) References Cited

FOREIGN PATENT DOCUMENTS

| | | |
|---|---|---|
| JP | 2010-208589 A | 9/2010 |
| JP | 2011-207442 A | 10/2011 |
| JP | 2017-222363 A | 12/2017 |
| WO | WO92/04847 A | 4/1992 |

CONVEYANCE SEAT

CROSS REFERENCE TO RELATED APPLICATIONS

This application is the U.S. National Stage entry of International Application No. PCT/JP2020/012260 filed under the Patent Cooperation Treaty and having a filing date of Mar. 19, 2020, which claims priority to Japanese Patent Application No. 2019-055602 having a filing date of Mar. 22, 2019, Japanese Patent Application No. 2019-055603 having a filing date of Mar. 22, 2019, and Japanese Patent Application No. 2019-086748 having a filing date of Apr. 26, 2019, all of which are incorporated herein by reference.

TECHNICAL FIELD

The present invention relates to a conveyance seat to be mounted in a vehicle, particularly to a conveyance seat that reduces a load to be applied at the time of a vehicle collision.

BACKGROUND ART

A conveyance seat has been provided with a countermeasure for a phenomenon in which an occupant moves backward to sink into a seat at the time of a vehicle collision (hereinafter, sinking phenomenon). For example, a technology depicted in PATENT LITERATURE 1 is disclosed as a countermeasure to reduce a load to be applied to an occupant who is a seated occupant when the sinking phenomenon occurs.

CITATION LIST

Patent Literature

PATENT LITERATURE 1: JP 2017-222363 A

SUMMARY OF INVENTION

Technical Problem

When the sinking phenomenon occurs, the sinking amount of a chest of the seated occupant is larger than the sinking amount of a neck, a lumbar, or the like. Because of a difference in sinking amount described above, the posture of the occupant is in a stooped state, and a forward load is applied to the occupant as a reaction force from the seat.

Therefore, the present invention has been made in view of the above problem, and an object of the present invention is to provide a technique in which when a sinking phenomenon occurs at the time of a vehicle collision, a cervical spine also moves in a well-balanced manner according to a movement of a thoracic spine to reduce the sinking amount of a chest, and to reduce a difference between the sinking amount of the chest and the sinking amount of a head, thereby suppressing a sense of discomfort of an occupant.

Solution to Problem

In order to solve the above problem, there is provided a conveyance seat including a seat back. The seat back includes a seat back frame, and a chest support member that is provided in an upper portion of the seat back frame, and that receives a chest of an occupant to reduce a backward movement load while moving backward with respect to the seat back frame, and to support the chest of the occupant when the backward movement load is applied to the occupant because of a vehicle collision. The chest support member is provided at a position to overlap the upper portion of the seat back frame in a height direction.

Since the conveyance seat of the present invention configured as described above includes the chest support member provided in the upper portion of the seat back frame to support the chest of the occupant, when a sinking phenomenon occurs, the sinking amount of the chest is reduced, and a difference between the sinking amount of the chest and the sinking amount of a head is reduced. Therefore, the load to be applied to the occupant at the time of a vehicle collision can be effectively reduced.

In addition, it is preferable that the conveyance seat further includes a headrest provided above the seat back; and a headrest guide provided at an upper end of the seat back frame to support the headrest, and that the chest support plate is provided to be connected to the headrest guide.

Since the chest support plate is provided at a position to overlap the headrest guide in a height direction, the difference between the sinking amount of the chest and the sinking amount of the head can be further reduced.

In addition, in the conveyance seat, it is more preferable that the chest support member is formed along an extending direction of a front surface of a headrest pillar when seen from a side surface of the conveyance seat.

In the above configuration, the occupant comes into contact with the headrest pillar and the chest support member substantially simultaneously at the time of a vehicle collision. Therefore, the difference between the sinking amount of the chest and the sinking amount of the head can be further reduced.

In addition, in the conveyance seat, it is more preferable that the chest support member is provided at a position to overlap an upper pipe of the seat back frame in the height direction.

Since the chest support member is provided at a position to overlap the upper pipe in the height direction, the positions of the headrest and the chest support member are very close to each other, so that the difference between the sinking amount of the chest and the sinking amount of the head can be further reduced.

In addition, in the conveyance seat, it is preferable that the seat back includes a pressure receiving portion provided in a side frame of the seat back frame to support the occupant from behind, and that the chest support member is provided to be located above the pressure receiving portion.

Since the chest support member is located above the pressure receiving portion, the difference between the sinking amount of the chest and the sinking amount of the head can be further reduced.

In addition, in the conveyance seat, it is preferable that the chest support member includes a first deformable member provided at an upper end of the chest support member to be connected to the seat back frame.

Since the first deformable member is provided at the upper end of the chest support member to be connected to the seat back frame, when a backward movement load is applied, the first deformable member is deformed, so that the backward movement load can be reduced more appropriately.

In addition, in the conveyance seat, it is more preferable that the chest support member is connected and fixed to a side portion of the seat back frame via a second deformable member.

Since the chest support member and the side portion of the seat back frame are connected to each other via the second deformable member, the movement amount of the chest support member at the time of application of a backward movement load is adjustable, and the backward movement load can be reduced more appropriately.

In addition, in order to solve the above problem, the conveyance seat further includes a headrest. The headrest includes a head support member inside the headrest, which receives a head of the occupant to turn backward, and to support the head of the occupant when the backward movement load is applied to the occupant. When the backward movement load is applied to the occupant, both the chest support member and the head support member receive the backward movement load.

In the conveyance seat of the present invention configured as described above, both the chest support member that supports the chest, and the head support member that supports the head receive the backward movement load, so that a cervical spine also moves in a well-balanced manner according to a movement of the thoracic spine. As a result, the sinking amount of the chest is reduced, and the difference between the sinking amount of the chest and the sinking amount of the head is reduced. Therefore, a sense of discomfort of the occupant can be suppressed.

In addition, in the conveyance seat, it is preferable that the chest support member and the head support member are provided in the seat back and the headrest, respectively, such that the chest support member moves backward first and the head support member turns backward next when the backward movement load is applied to the occupant.

In addition, in the conveyance seat, it is preferable that the head support member includes a neck support portion that receives a neck of the occupant to support the neck of the occupant when the backward movement load is applied to the occupant.

Since the head support member includes the neck support portion that supports the neck of the occupant, the head support member allows the neck of the occupant to move backward while supporting the neck.

In addition, in the conveyance seat, it is preferable that in the head support member, a portion facing the head of the occupant is formed in a recessed shape to be recessed backward, and a portion facing a neck of the occupant is formed in a protruding shape to protrude forward.

In addition, in the conveyance seat, it is more preferable that the chest support member has a chest contact surface that comes into contact with the chest of the occupant, that the head support member has a head contact surface that comes into contact with the head of the occupant, and that a lower end of the head contact surface is located on an extension of the chest contact surface when the conveyance seat is seen from a side.

Since the lower end of the head contact surface is located on the extension of the chest contact surface, the head contact surface and the chest contact surface are disposed on a straight line to facilitate receiving the occupant.

In addition, in the conveyance seat, it is more preferable that the chest support member and the head support member are disposed to align a center of the chest support member in a width direction with a center of the head support member in the width direction.

Since the chest support member and the head support member are disposed to align the centers thereof with each other, a spine of the occupant, particularly the thoracic spine can be supported in a state where the thoracic spine is received more reliably.

In addition, in the conveyance seat, it is more preferable that a length of the chest support member in a width direction is larger than a length of the head support member in the width direction.

Since the length of the chest support member in the width direction is set large, the chest of the occupant can be received and supported more reliably.

In addition, in the conveyance seat, it is more preferable that a storage portion that stores the chest support member is provided in a pad back surface of the seat back.

Since the storage portion that stores the chest support member is provided in the pad back surface of the seat back, the position of the chest support member is stable, for example, during normal use.

In addition, in the conveyance seat, it is preferable that when the backward movement load is applied to the occupant to move the chest support member backward, a lower portion of the chest support member is deformed before an upper portion of the chest support member is deformed.

Since the lower portion of the chest support member is deformed before the upper portion of the chest support member is deformed, the difference between the sinking amount of the chest and the sinking amount of the head can be further reduced.

In addition, in the conveyance seat, it is preferable that when the backward movement load is applied to the occupant to move the chest support member backward, a movement amount of the upper portion of the chest support member is larger than a movement amount of the lower portion of the chest support member.

When the backward movement load is applied, the movement amount of the headrest that supports the head of the occupant is increased since a rotation axis of the seat back is present on a lower side of the seat back. For that reason, when the movement amount of the upper portion of the chest support member is set to be larger than the movement amount of the lower portion of the chest support member, the difference between the sinking amount of the chest and the sinking amount of the head can be reduced.

In addition, in the conveyance seat, it is preferable that the first deformable member has a hinge structure.

Since the first deformable member has a hinge structure, the backward movement load can be reduced more appropriately.

In addition, in the conveyance seat, it is more preferable that the chest support member and the head support member are provided in the seat back and the headrest, respectively, such that the head support member turns backward while the chest support member moves backward, and thus both the chest support member and the head support member receive the backward movement load.

In addition, in the conveyance seat, it is more preferable that when the backward movement load is applied to the occupant, a movement amount of the chest support member is larger than a movement amount of the head support member.

Since the movement amount of the chest support member at the time of application of the backward movement load is set large, a load on the chest can be reduced in a state where the spine shape is maintained.

Advantageous Effects of Invention

According to the present invention, since the chest support member is provided at a position to overlap the upper portion of the seat back frame in the height direction, when a sinking phenomenon occurs at the time of a vehicle collision, the sinking amount of the chest is reduced, and the difference between the sinking amount of the chest and the sinking amount of the head is reduced. Therefore, a load to be applied to the occupant at the time of the vehicle collision can be effectively reduced.

In addition, since the chest support member is provided at a position to overlap the headrest guide in the height direction, the difference between the sinking amount of the chest and the sinking amount of the head can be further reduced.

In addition, in a case where the chest support member is formed along the extending direction of the front surface of the headrest pillar when seen from the side surface of the conveyance seat, the occupant comes into contact with the headrest pillar and the chest support member substantially simultaneously at the time of a vehicle collision. Therefore, the difference between the sinking amount of the chest and the sinking amount of the head can be further reduced.

In addition, since the chest support member is provided at a position to overlap the upper pipe in the height direction, the positions of the headrest and the chest support member are very close to each other, so that the difference between the sinking amount of the chest and the sinking amount of the head can be further reduced.

In addition, since the chest support member is located above the pressure receiving portion, the difference between the sinking amount of the chest and the sinking amount of the head can be further reduced.

Since the first deformable member is provided at the upper end of the chest support member to be connected to the seat back frame, when a backward movement load is applied, the first deformable member is deformed, so that the backward movement load can be reduced more appropriately.

Since the chest support member and the side portion of the seat back frame are connected to each other via the second deformable member, the movement amount of the chest support member at the time of application of a backward movement load is adjustable, and the backward movement load can be reduced more appropriately.

In addition, since the storage portion that stores the chest support member is provided in the pad back surface of the seat back, the position of the chest support member is stable, for example, during normal use.

In addition, according to the present invention, at the time of a vehicle collision, both the chest support member that supports the chest, and the head support member that supports the head receive a backward movement load of the occupant, so that the cervical spine also moves in a well-balanced manner according to a movement of the thoracic spine. Therefore, a sense of discomfort of the occupant can be suppressed.

At that time, the chest support member receives the load first, and the head support member receives the load next, so that the load is received according to a backward movement of the occupant. Therefore, a sense of discomfort of the occupant at the time of the vehicle collision can be further suppressed.

In addition, it is more effective when both the chest support member and the head support member simultaneously receive a load.

In addition, since the head support member includes the neck support portion that supports the neck of the occupant, the head support member allows the neck of the occupant to move backward while supporting the neck.

In addition, the portion facing the head of the occupant is formed in a recessed shape to be recessed backward, and the portion facing the neck of the occupant is formed in a protruding shape to protrude forward. Accordingly, the head and the neck of the occupant are stably supported.

Since the lower end of the head contact surface is located on the extension of the chest contact surface, the spine shape of the occupant and the shapes of the head contact surface and the chest contact surface are disposed on a straight line to facilitate receiving the occupant.

In addition, since the chest and the head contact surface are disposed to align the centers thereof with each other, the spine of the occupant, particularly the thoracic spine can be supported in a state where the thoracic spine is received more reliably.

Since the length of the chest support member in the width direction is set large, the chest of the occupant can be received and supported more reliably.

In addition, since the storage portion that stores the chest support member is provided in the pad back surface of the seat back, the position of the chest support member is stable, for example, during normal use.

In addition, since the lower portion of the chest support member is deformed before the upper portion of the chest support member is deformed, the difference between the sinking amount of the chest and the sinking amount of the head can be further reduced.

In addition, when the movement amount of the upper portion of the chest support member is set to be larger than the movement amount of the lower portion of the chest support member, the difference between the sinking amount of the chest and the sinking amount of the head can be reduced.

Since the first deformable member has a hinge structure, the backward movement load can be reduced more appropriately.

Since the movement amount of the chest support member at the time of application of the backward movement load is set large, a load on the chest can be reduced in a state where the spine shape is maintained.

DESCRIPTION OF EMBODIMENTS

Hereinafter, conveyance seats according to embodiments of the present invention (hereinafter, the present embodiment) will be described with reference to FIGS. 1 to 18.

Incidentally, the embodiments to be described below are merely one example to facilitate understanding of the present invention, and do not limit the present invention. Namely, the shapes, dimensions, dispositions, and the like of members to be described below can be changed or improved without departing from the concept of the present invention, and it goes without saying that the present invention includes equivalents thereof. In addition, in the following embodiments, the same or similar components are denoted by common reference signs, and in order to facilitate understanding, the scales of the drawings are appropriately changed.

Incidentally, in the following description, as indicated by arrows in FIG. 1, a front to back direction means a front to back direction when seen from an occupant seated in a conveyance seat, a width direction means a width direction (lateral width direction) of a seat back of the conveyance seat, and a height direction means a height direction of the seat back, strictly speaking, means an up to down direction of the seat back when the seat back is seen from the front. In addition, unless otherwise specified, the shape or disposition position of each member to be described later is a shape or disposition position in a seatable state of the conveyance seat.

First Embodiment

Figure 2:
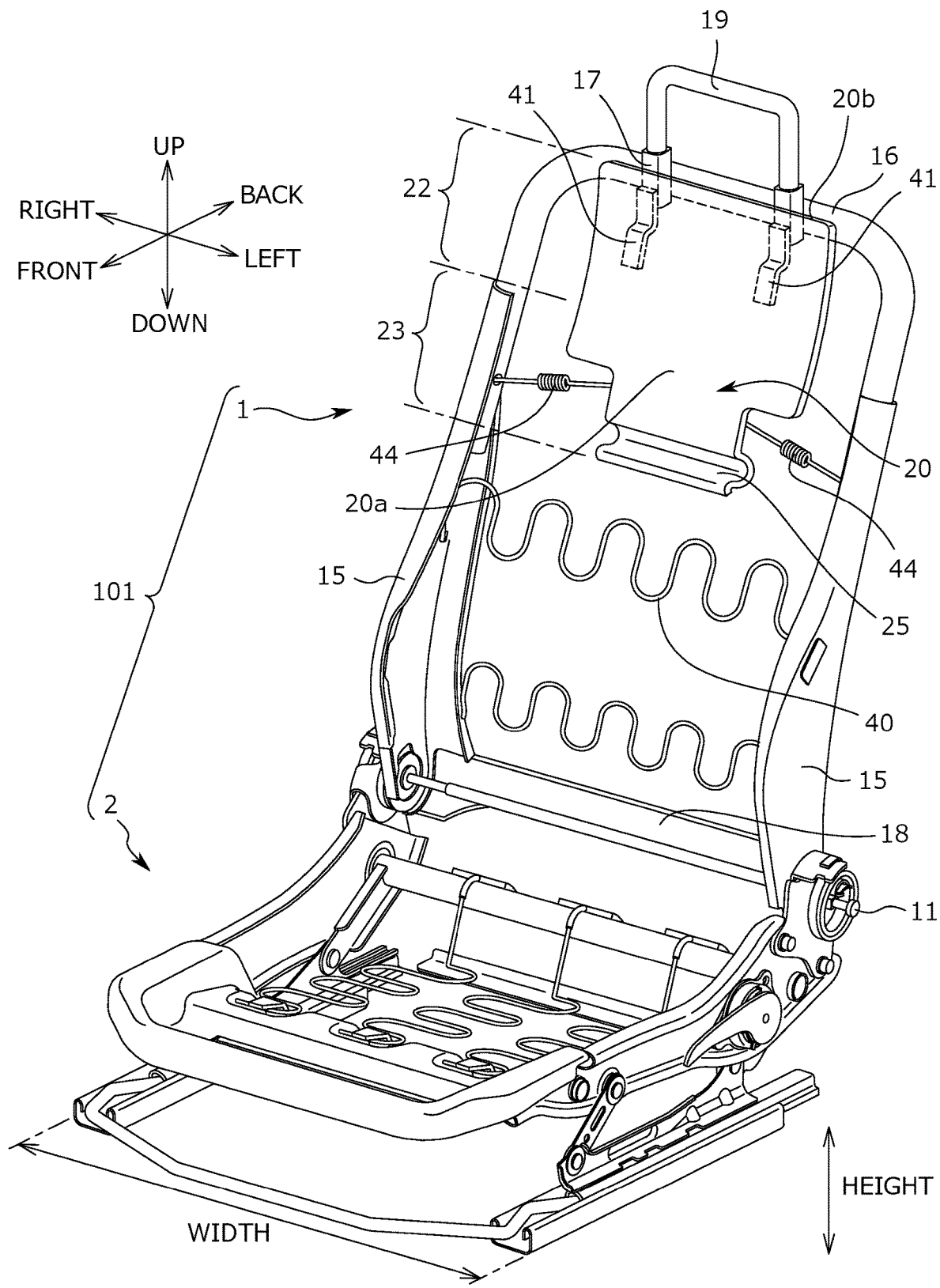
FIG. 2 is a schematic perspective view illustrating a seat frame according to a first embodiment.
Figure 3:
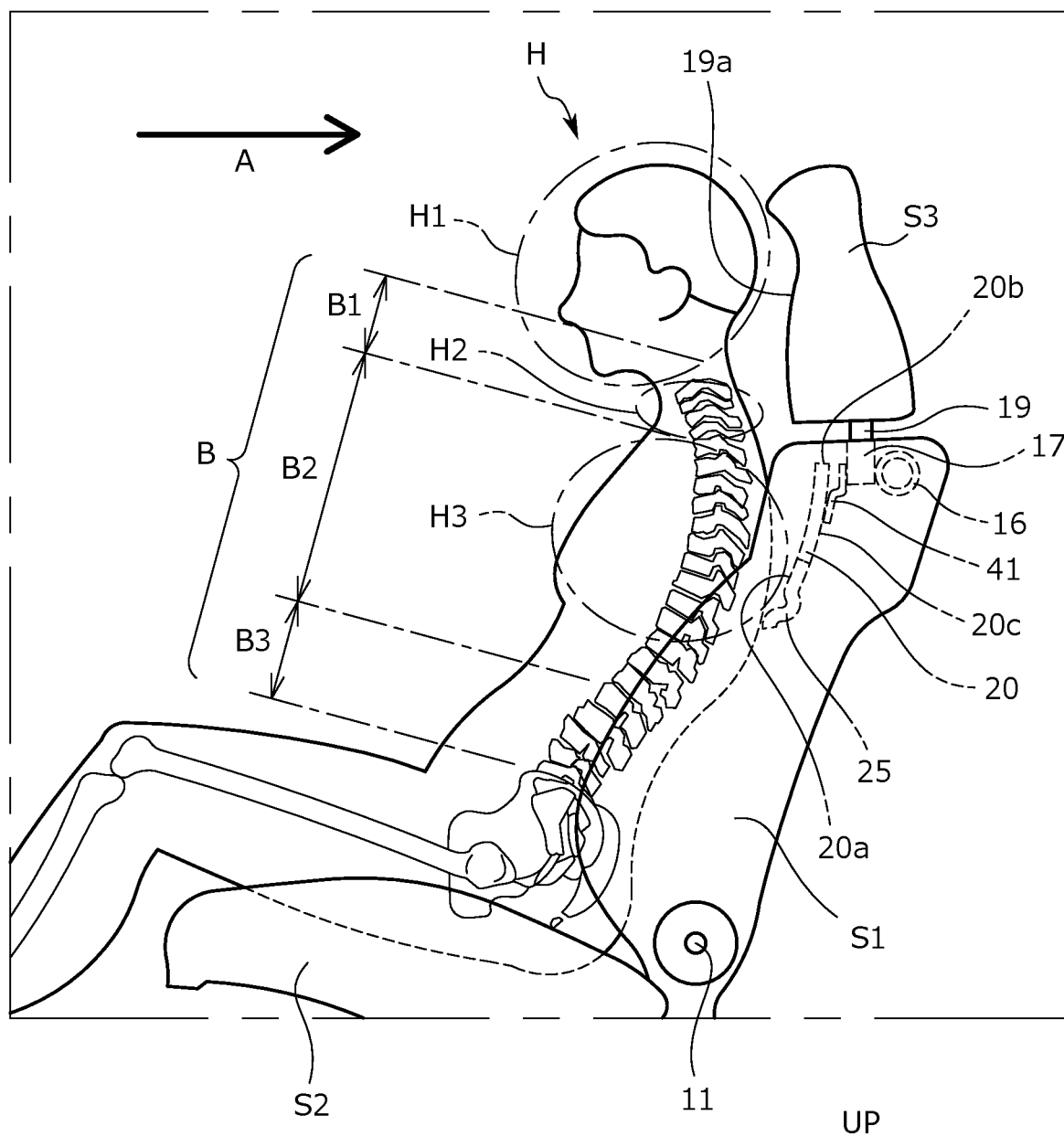
FIG. 3 is a schematic view illustrating a state where an occupant is seated in the conveyance seat.
Figure 4:
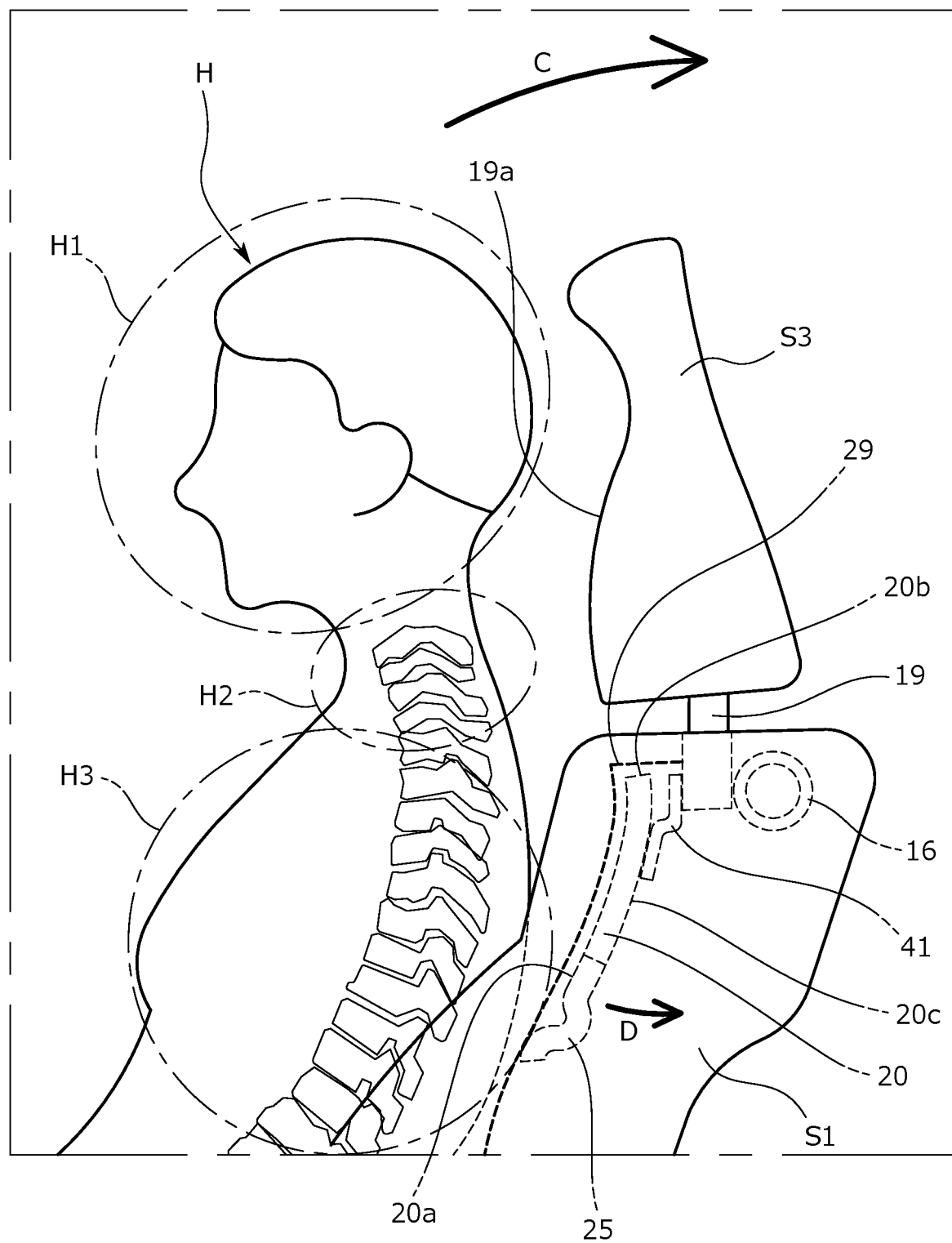
FIG. 4 is an enlarged view of the conveyance seat.
Figure 5:
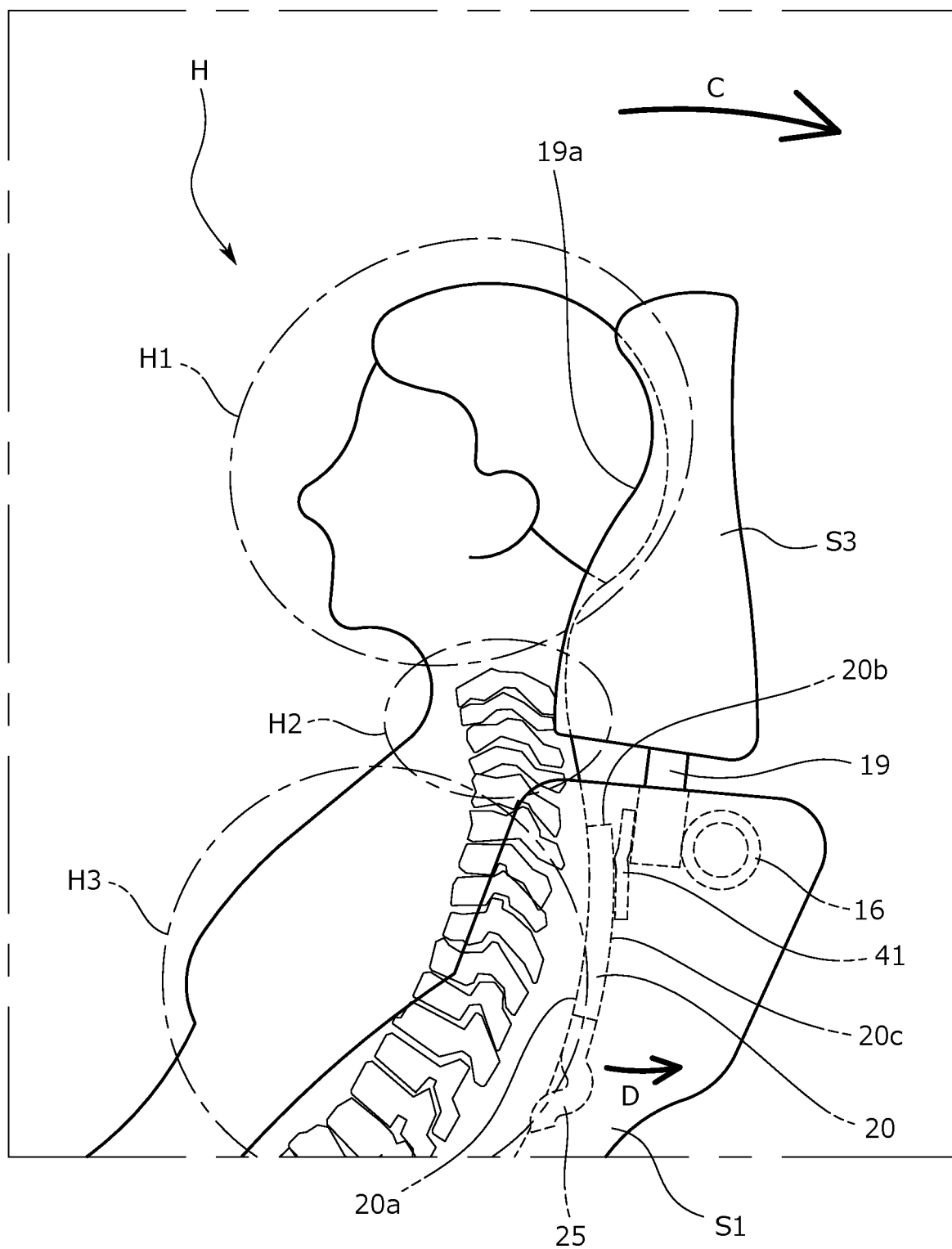
FIG. 5 is a view illustrating a state where the conveyance seat is moved backward while supporting a head and a chest of the occupant.
Figure 6A:
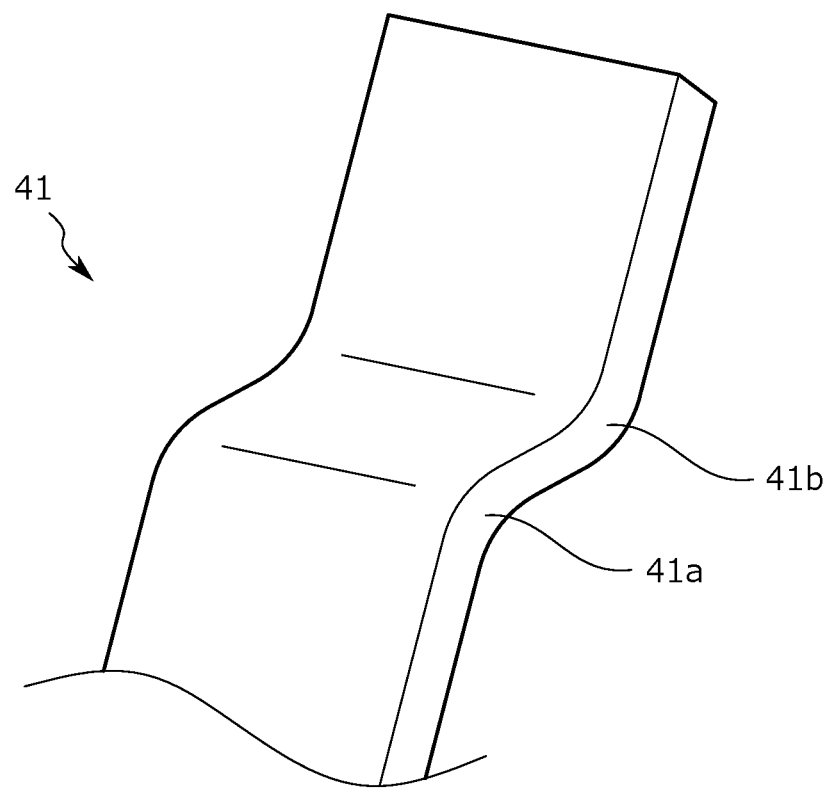
FIG. 6A is a perspective view illustrating a first deformable member.
Figure 6B:
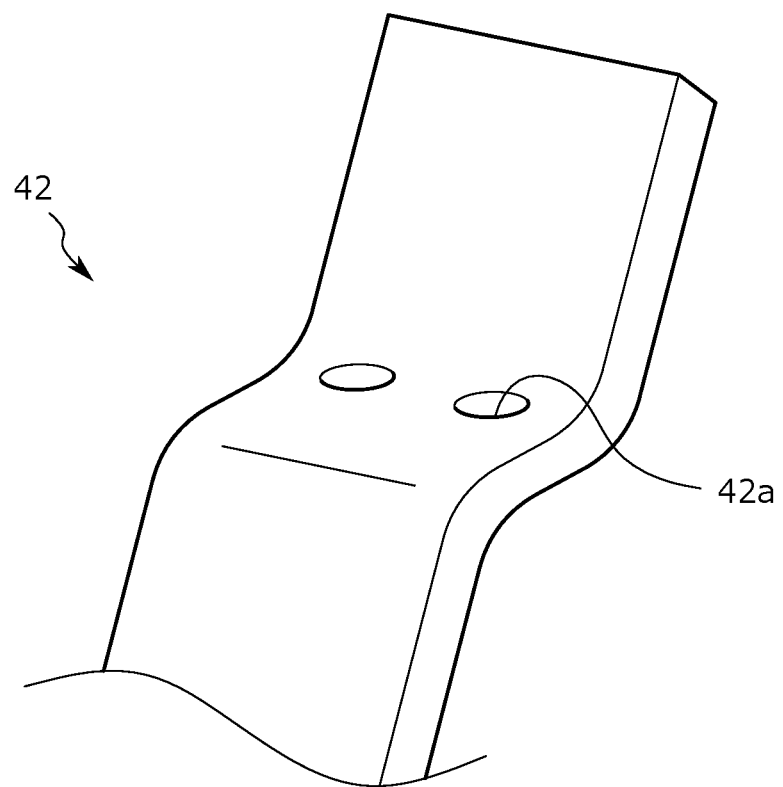
FIG. 6B is a perspective view illustrating another example of the first deformable member.
Figure 6C:
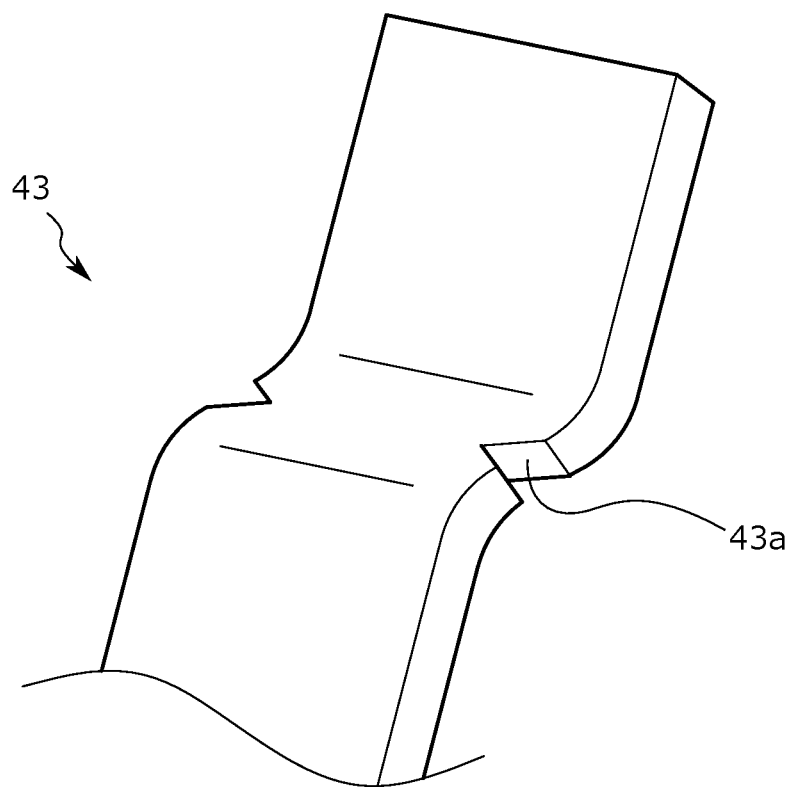
FIG. 6C is a perspective view illustrating another example of the first deformable member.

First, an entire configuration of a conveyance seat 100 including a seat frame 101 which is a first embodiment of the present invention will be described with reference to FIGS. 1 to 7D. FIGS. 1 and 2 are views illustrating a structure example of the conveyance seat 100 and a seat frame SF, FIG. 1 is a perspective view illustrating an exterior shape of the conveyance seat 100, and FIG. 2 is a perspective view illustrating an exterior shape of the seat frame 101. FIGS. 3 and 4 are views illustrating a state where an occupant H is seated in the conveyance seat 100, and FIG. 5 is a view illustrating a state where the occupant H is moved backward while being supported when a backward movement load is applied. FIGS. 6A to 6C are perspective views illustrating a first deformable member and other examples thereof, and FIGS. 7A to 7D are perspective views illustrating a second deformable member and other examples thereof.

Figure 1:
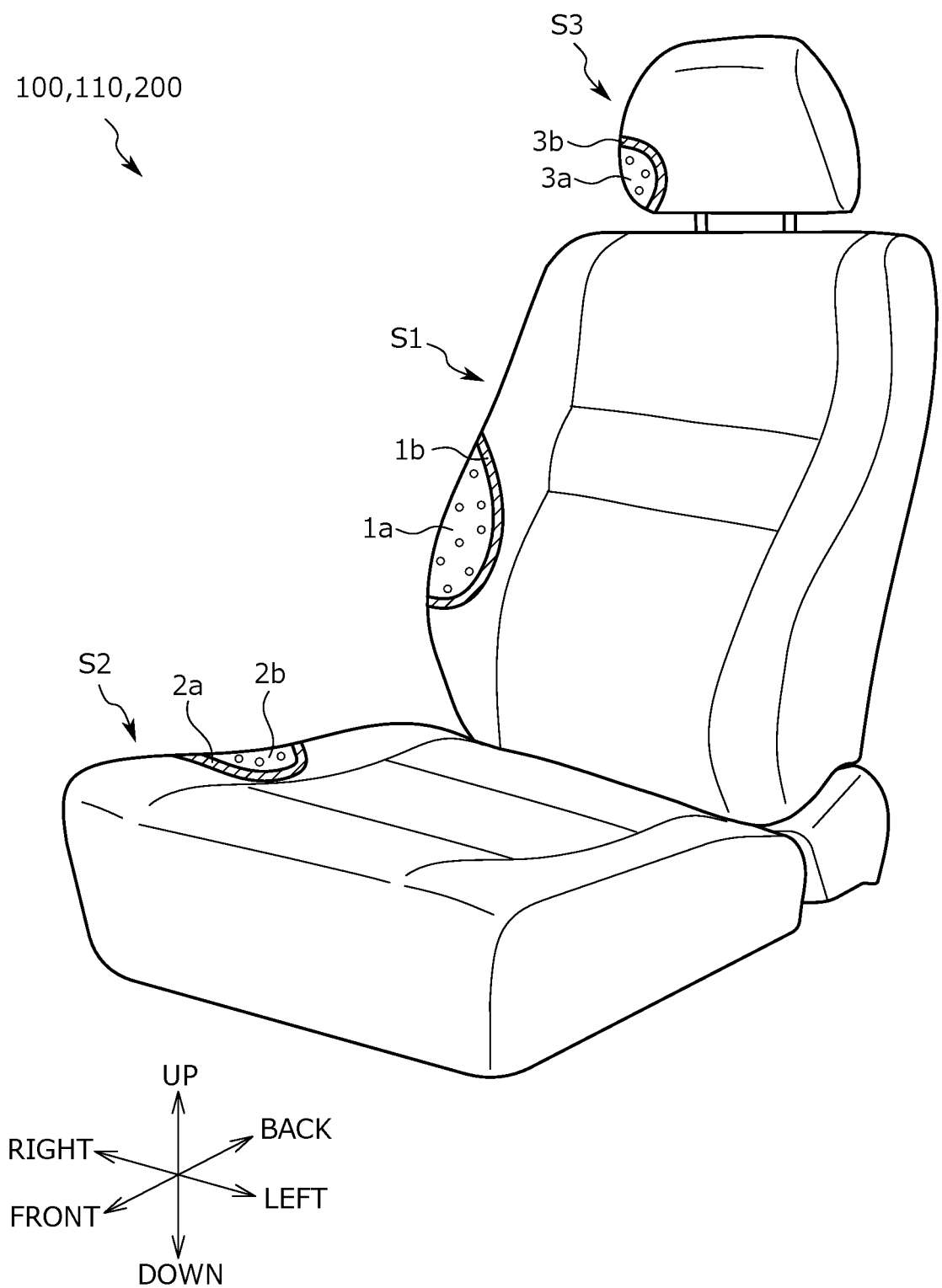
FIG. 1 is a schematic perspective view of a conveyance seat according to the present embodiment.

As illustrated in FIG. 1, the conveyance seat 100 includes a seat back S1 that supports a back (chest H3 and the like) of the occupant H, a seat cushion S2 that supports buttocks of the occupant H, and a headrest S3 that supports a head H1 of the occupant H. The above components are formed by placing pads 1a, 2a, and 3a on frames as skeletons of the components and covering the pads 1a, 2a, and 3a with skin materials 1b, 2b, and 3b.

Here, as illustrated in FIG. 2, in the seat frame 101, a lower end portion of a seat back frame 1 forming the skeleton of the seat back S1 is connected to a rear end portion of a seat cushion frame 2 forming the skeleton of the seat cushion S2. In addition, a reclining mechanism not illustrated intervenes between the seat back frame 1 and the seat cushion frame 2. Accordingly, the seat back frame 1 is turnable around a reclining shaft 11 with respect to the seat cushion frame 2, and the backward tilt angle (backrest angle) of the seat back S1 with respect to the seat cushion S2 is adjustable. Incidentally, the reclining shaft 11 penetrates through aside lower end portion of the seat back frame 1 and a side rear end portion of the seat cushion frame 2 to protrude slightly outward in the width direction.

In addition, a headrest guide 17 having a tubular shape is attached to an upper central portion of the seat back frame 1. Then, a headrest pillar 19 extending from a lower end of the headrest S3 is inserted into the headrest guide 17 to attach the headrest S3 to the seat back S1.

Next, a configuration example of the seat back frame 1 will be described with reference to FIG. 2. FIG. 2 is a perspective view illustrating an exterior shape of the seat back frame 1 according to the present embodiment, and the width direction and the height direction are indicated by arrows in the same drawings.

As illustrated in FIG. 2, the seat back frame 1 is a substantially rectangular frame generally formed of a metal member, and includes, as main components, a pair of side frames 15 provided in both end portions in the width direction, an upper pipe 16 provided in an upper end portion in the height direction, and a lower frame bridging portion 18 provided in a lower end portion. Incidentally, in the present embodiment, the side frames 15, the upper pipe 16, and the lower frame bridging portion 18 are combined and integrated from a state where the side frames 15, the upper pipe 16, and the lower frame bridging portion 18 are separated from each other, to form the seat back frame 1, but may be originally integrated and molded, namely, may be integrally molded of a resin material.

The pair of side frames 15 are separated from each other in a right to left direction to define a width of the seat back S1, and both the side frames 15 are disposed to extend in the up to down direction. As illustrated in FIG. 2, in the pair of side frames 15, an upper end portion of each of the side frames 15 is located slightly behind a lower end portion thereof in a state where the posture of the conveyance seat 100 is in a seatable posture. In addition, the lower end portion of each of the side frames is formed wider than the upper end portion in the front to back direction.

The upper pipe 16 connects the upper end portions of the pair of side frames 15, and is formed in an inverted U-shape in a front view. The upper pipe 16 according to the present embodiment is formed by bending a steel pipe, and both end portions thereof are attached to the upper end portions of the side frames 15. In addition, two headrest guides 17 (may also be called pillar support portions) described above are attached to a central portion of the upper pipe 16 at an interval from each other.

As illustrated in FIG. 2, a chest support member 20 is provided in an upper portion of the seat back frame 1. Then, as illustrated in FIG. 5, when a backward movement load is applied to the occupant (seated occupant) because of a vehicle collision, the chest support member 20 receives the chest of the occupant to reduce the backward movement load while moving backward with respect to the seat back frame 1, and to support the chest H3 of the occupant H.

The chest support member 20 is a flat plate-shaped member, and as illustrated in FIG. 2, a back surface (surface opposite a chest contact surface 20*a*, namely, a back surface 20*c*) of the chest support member 20 is fixed to the upper pipe 16 of the seat back frame 1 via a first deformable member 41. The chest support member 20 is attachedly provided at a position to overlap the upper pipe 16 (upper portion of the seat back frame 1) in the height direction. Namely, the chest support member 20 is provided such that an upper end 20*b* of the chest support member 20 is located at substantially the same position as that of the upper pipe 16. The first deformable member 41 is connected to the headrest guide 17 provided at an upper end of the seat back frame 1. Then, the chest support member 20 is provided at a position to overlap the headrest guide 17 in the height direction. Namely, the chest support member 20 is installed such that the upper end 20*b* is present within a height range of the headrest guide 17 (refer to FIG. 3).

The chest support member 20 is formed along an extending direction of a front surface 19*a* of the headrest S3 when seen from a side surface of the conveyance seat 100 (refer to FIG. 3).

In addition, a lower flange portion 25 is formed in a lower end portion of the chest support member 20. The chest support member 20 is reinforced by the lower flange portion 25, and the chest support member 20 is suppressed from being curved backward when the chest support member 20 receives a load from the chest of the occupant H. Incidentally, as illustrated in FIG. 4, the chest support member 20 is provided in contact with a storage portion 29 (chest support member-storage portion) formed in a pad back surface of the seat back S1. Since the chest support member 20 is installed in the storage portion 29 that is formed in a recessed shape in the pad back surface to allow the chest support member 20 to be in contact therewith, the position of the chest support member 20 is stable during normal use.

As illustrated in FIG. 2, the seat back frame 1 includes a pressure receiving portion 40 formed of an S-shaped spring. The pressure receiving portion 40 supports a lumbar of the occupant H from behind. The chest support member 20 is provided to be located above the pressure receiving portion 40, and supports the chest H3 of the occupant H.

As illustrated in FIG. 2, the chest support member 20, specifically, the back surface 20*c* of the chest support member 20 and the headrest guide 17 are connected to each other by the first deformable member 41. In the present embodiment, as illustrated in FIGS. 2 and 6C, the first deformable member 41 is realized by using a plate spring. In addition, the chest support member 20 is connected to a side portion of the seat back frame 1 via a second deformable member 44. The second deformable member 44 is realized by a coil spring. In addition, the first deformable member 41 has a hinge structure. For this reason, at the time of a vehicle collision, when a backward movement load is applied to the occupant H in a direction of arrow A in FIG. 3, the first deformable member 41 and the second deformable member 44 are deformed, so that the chest support member 20 turns in a direction of arrow D as illustrated in FIG. 5 to reduce the backward movement load.

When the occupant H is moved backward (in the direction of arrow A in FIG. 3) due to the backward movement load, a lower portion 23 of the chest support member 20 is deformed before an upper portion 22 of the chest support member 20 is deformed.

FIGS. 3 and 4 illustrate a state of the occupant H and the conveyance seat 100 before a vehicle collision. In addition, FIG. 5 illustrates a state of the occupant H and the conveyance seat 100 at the time of a vehicle collision. When a backward movement load is applied, the occupant H is moved backward, and the head H1 and the chest H3 of the occupant H sink into the headrest S3 and the seat back S1, respectively. At that time, as illustrated in FIG. 5, the chest H3 comes into contact with the chest support member 20, and the backward movement load is reduced, so that a backward movement amount of the chest H3 is suppressed. Namely, the sinking amount of the chest H3 is reduced, and a difference between the sinking amount of the chest H3 and the sinking amount of the head H1 is reduced. The posture of the occupant is maintained as usual, and the occupant is suppressed from stooping. Namely, a load to be applied to the occupant H at the time of a vehicle collision is effectively reduced.

When a backward movement load is applied to the occupant H to move the chest support member 20 backward, the movement amount of the upper portion 22 of the chest support member 20 is set to be larger than the movement amount of the lower portion 23 of the chest support member 20. When the backward movement load is applied, the seat back S1 is tilted around the reclining shaft 11 in a direction of arrow C in FIG. 5, so that the movement amount of the upper portion 22 is larger than the movement amount of the lower portion 23. Therefore, the occupant H is suppressed from stooping.

As illustrated in FIG. 6A, the first deformable member 41 that connects the chest support member 20 and the seat back frame 1 includes bent portions 41*a* and 41*b* bent in the middle thereof. Therefore, the first deformable member 41 is elastically deformable, and the angle or amount of deformation of the chest support member 20 with respect to the seat back frame 1 is adjustable.

In addition, as in a first deformable member 42 illustrated in FIG. 6B, a hole portion 42*a* may be formed in the middle of the first deformable member 42. In addition, as in a first deformable member 43 illustrated in FIG. 6C, a cutout 43*a* may be formed in the middle of the first deformable member 43. The amount of deformation of the first deformable member 42 is adjustable by forming the hole portion 42a or the cutout 43a.

Incidentally, the first deformable member 41, 42, or 43 may be provided to connect a side portion of the chest support member 20 and the seat frame. The first deformable members 41, 42, and 43 are realized by plate springs, but similarly to the second deformable members 44 to 47 to be described later, may be realized by coil springs, dampers, or the like.

Figure 7A:
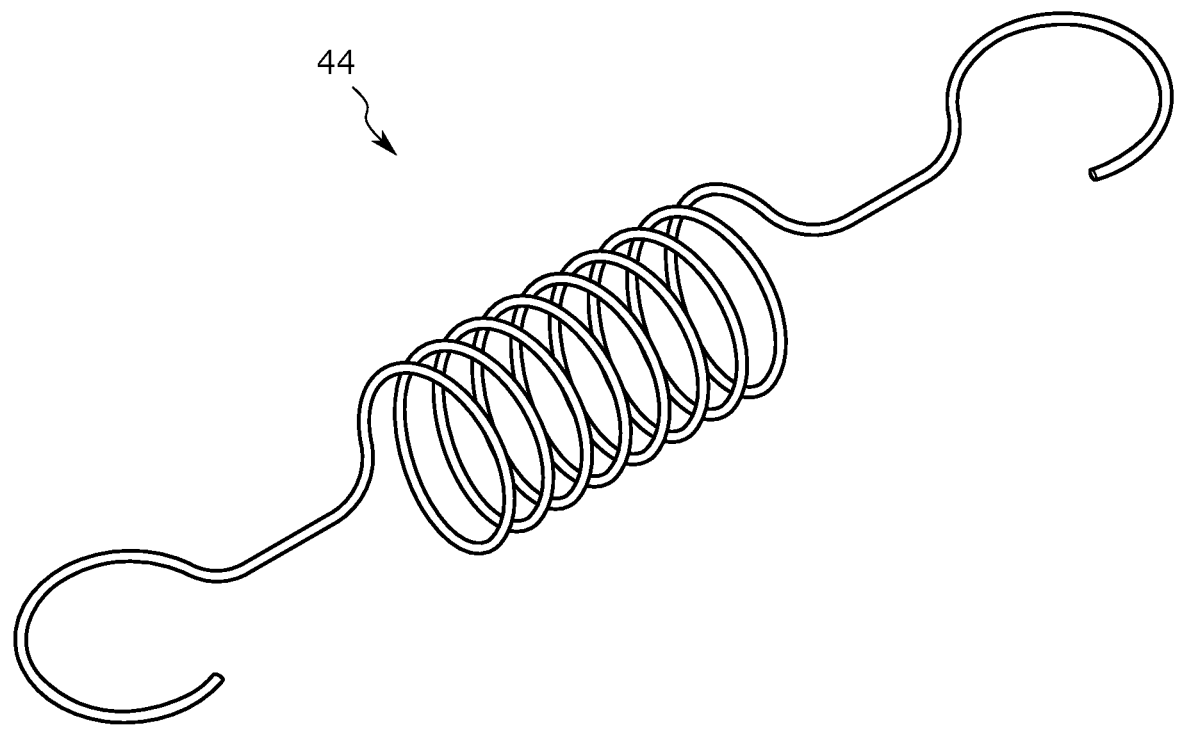
FIG. 7A is a perspective view illustrating a second deformable member.
Figure 7B:
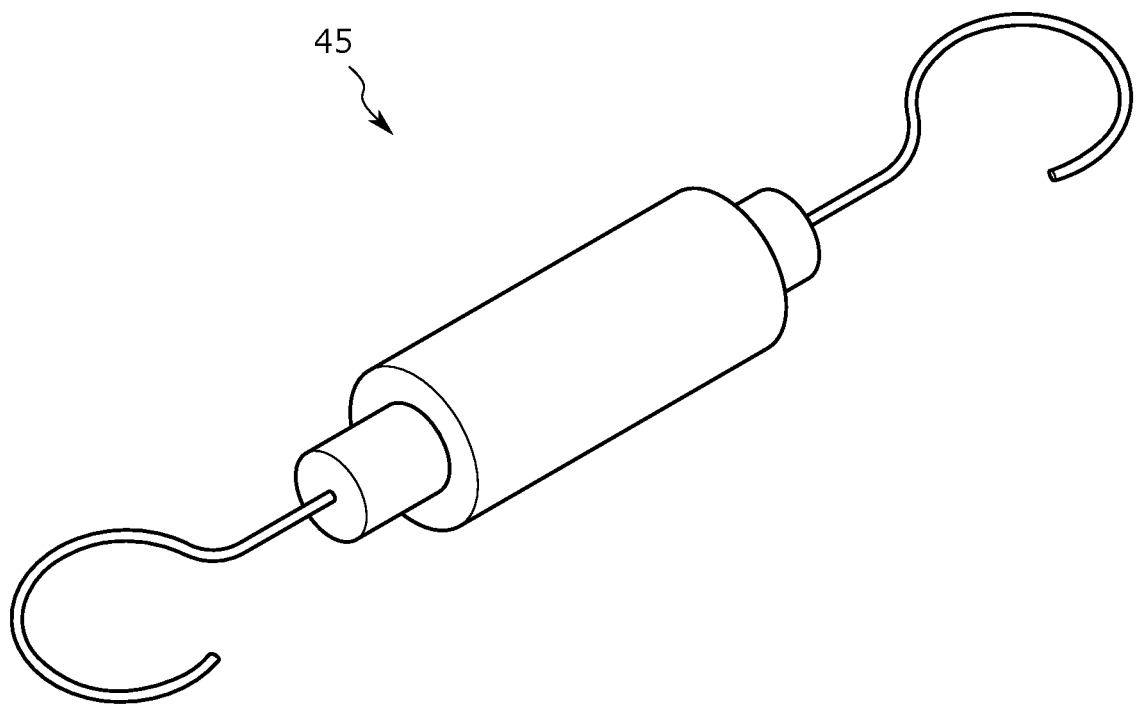
FIG. 7B is a perspective view illustrating another example of the second deformable member.
Figure 7C:
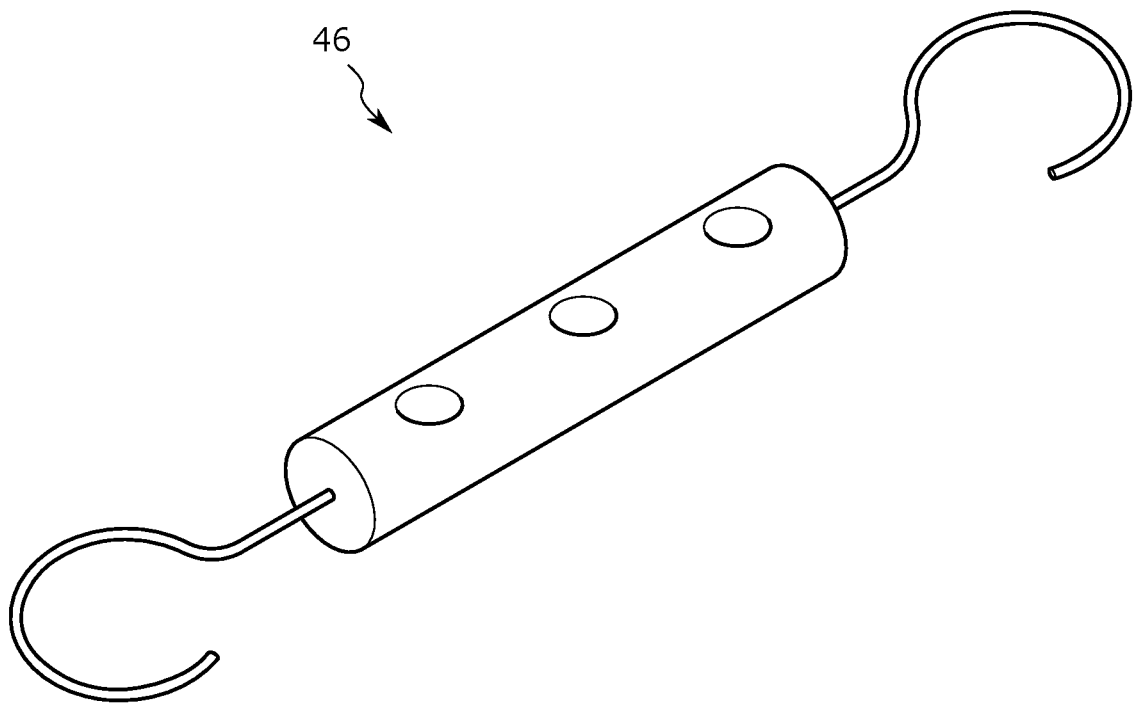
FIG. 7C is a perspective view illustrating another example of the second deformable member.
Figure 7D:
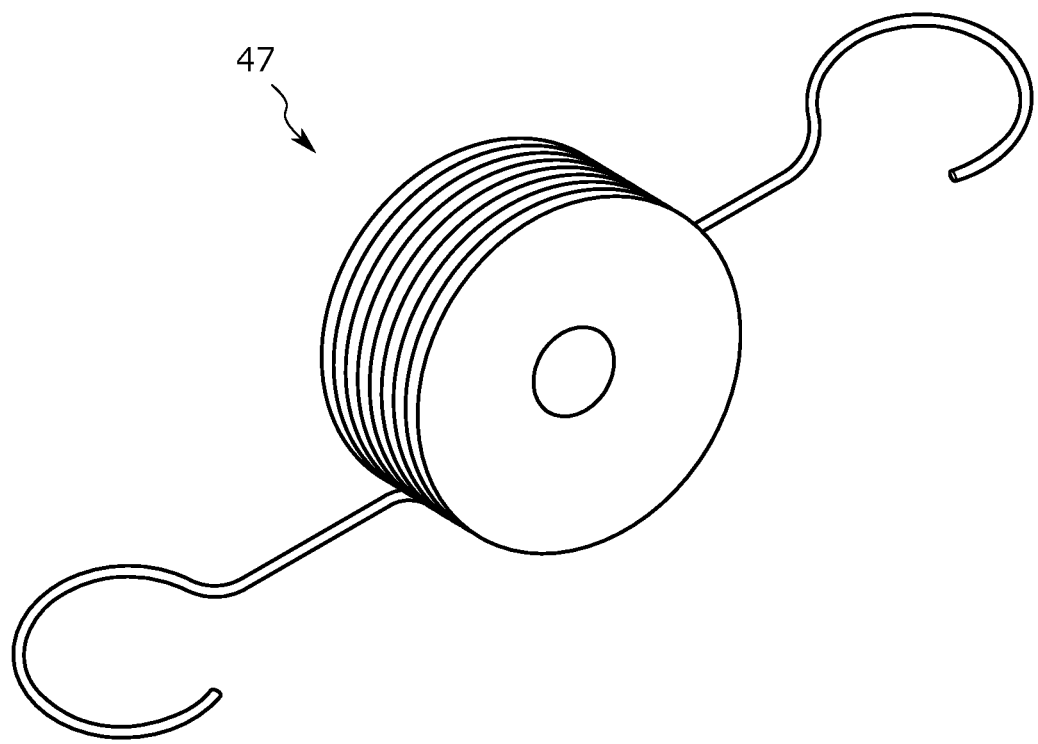
FIG. 7D is a perspective view illustrating another example of the second deformable member.

In addition, a coil spring illustrated in FIG. 7A is provided as the second deformable member 44 in the chest support member 20 and a connecting portion (side portion of the seat back frame 1) between the upper pipe 16 and the side frame 15. The second deformable member may be realized by a telescopic damper as in the second deformable member 45 illustrated in FIG. 7B. In addition, as in the second deformable member 46 illustrated in FIG. 7C, the second deformable member may be realized by a deformable bracket in which a plurality of holes 46a are formed. The second deformable member may be realized by a turnable damper as in the second deformable member 47 illustrated in FIG. 7D.

In addition, the second deformable members 44 to 47 may be realized by plate springs similarly to the first deformable members 41 to 43.

Second Embodiment

A conveyance seat 110 that is a second embodiment of the present invention will be described with reference to FIGS. 8 to 14B. Incidentally, since the seat exterior shape of the conveyance seat 110 is the same as that of the conveyance seat 100 illustrated in FIG. 1, and the structure of the seat cushion frame 2 of a seat frame 102 is also the same as that of the seat cushion frame 2 illustrated in FIG. 2, a description thereof will be omitted.

Figure 8:
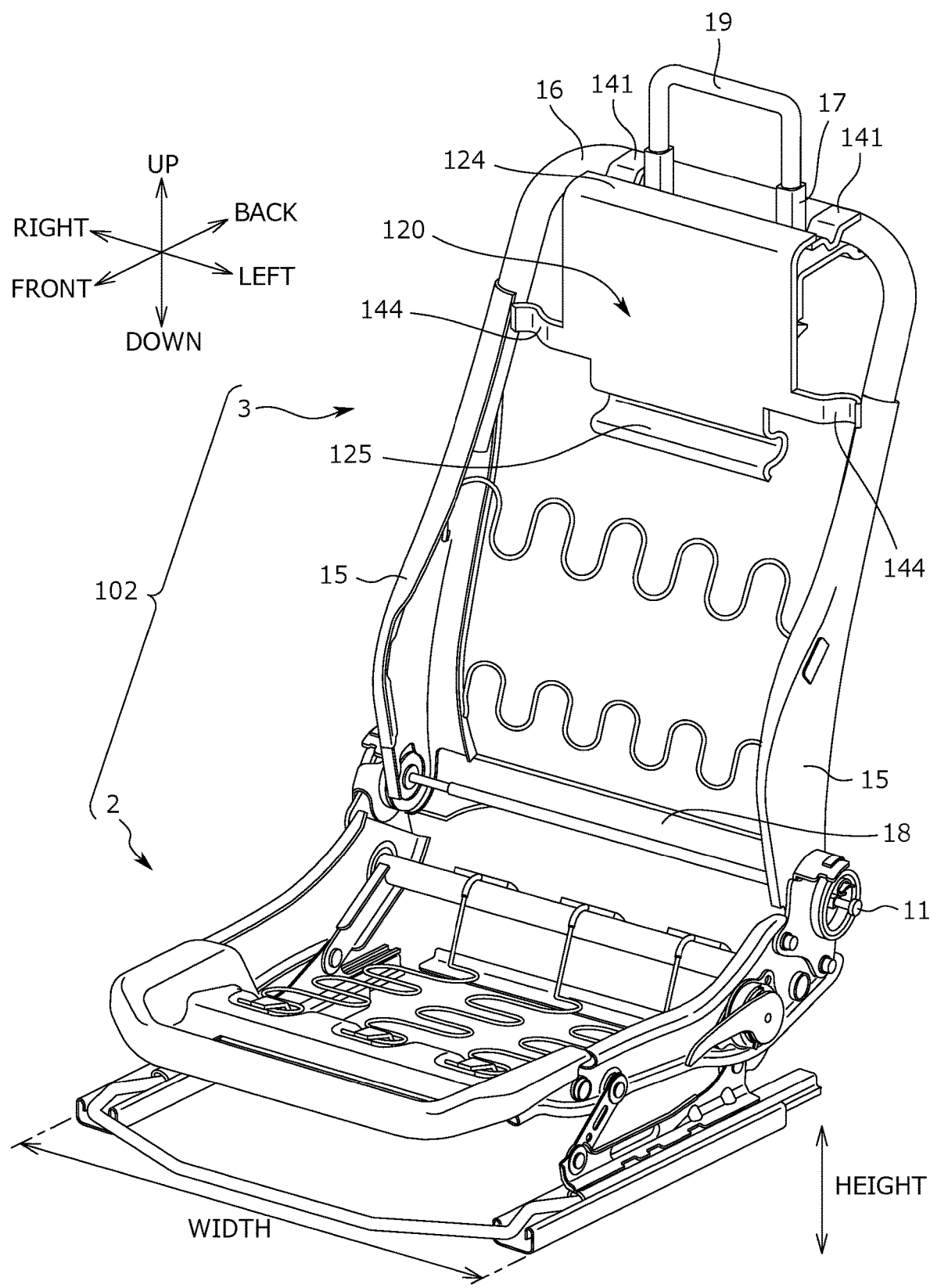
FIG. 8 is a schematic perspective view illustrating a seat frame according to a second embodiment.
Figure 9:
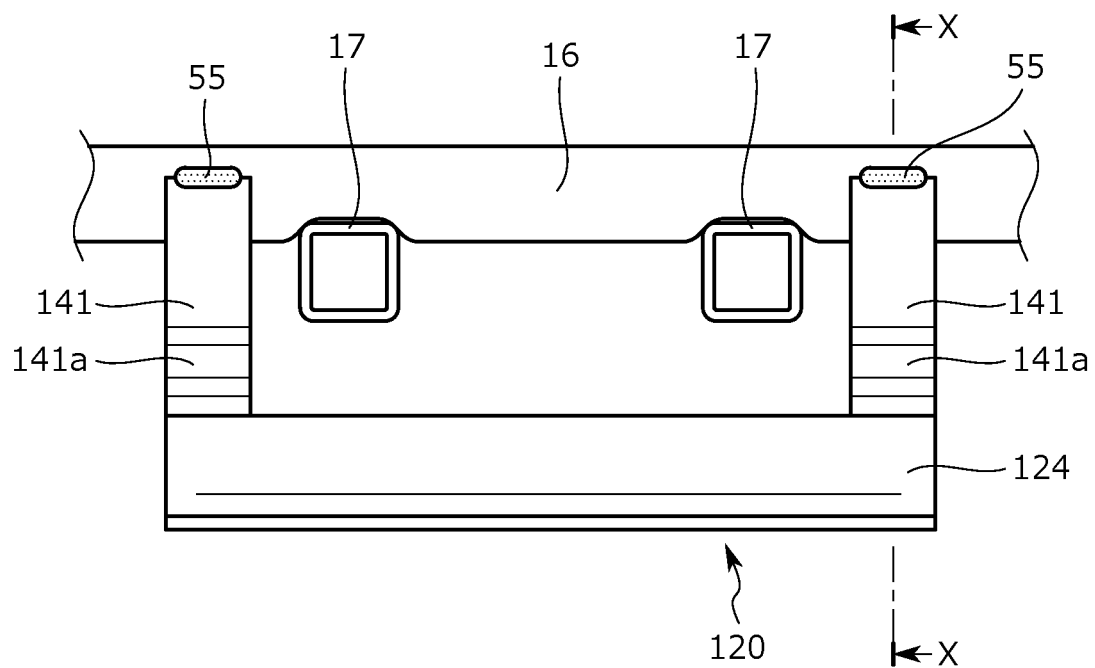
FIG. 9 is a plan view illustrating upper portions of a chest support member and a seat back frame.
Figure 9:
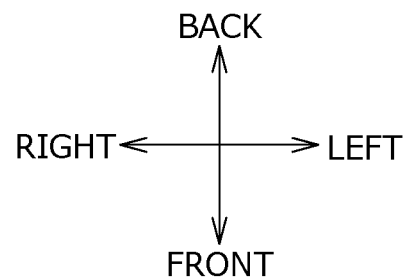

A seat back frame 3 of the conveyance seat 110 has substantially the same structure as that of the seat back frame 1 of the conveyance seat 100 of the first embodiment, and as illustrated in FIG. 8, is a substantially rectangular frame generally formed of a metal member. The seat back frame 3 includes, as main components, the pair of side frames 15 provided in both end portions in the width direction, the upper pipe 16 provided in an upper end portion in the height direction, and the lower frame bridging portion 18 provided in a lower end portion. A configuration for fixing a chest support member 120 to the seat back frame 3 is different.

The chest support member 120 is a flat plate-shaped member, and as illustrated in FIG. 8, an upper flange portion 124 and a lower flange portion 125 are provided in an upper end portion and a lower end portion of the chest support member 120, respectively. The chest support member 120 is reinforced by the upper flange portion 124 and the lower flange portion 125, and the chest support member 120 is suppressed from being curved when a load is applied. In addition, the chest support member 120 is connected to the side frame 15 by a second deformable member 144.

Figure 10A:
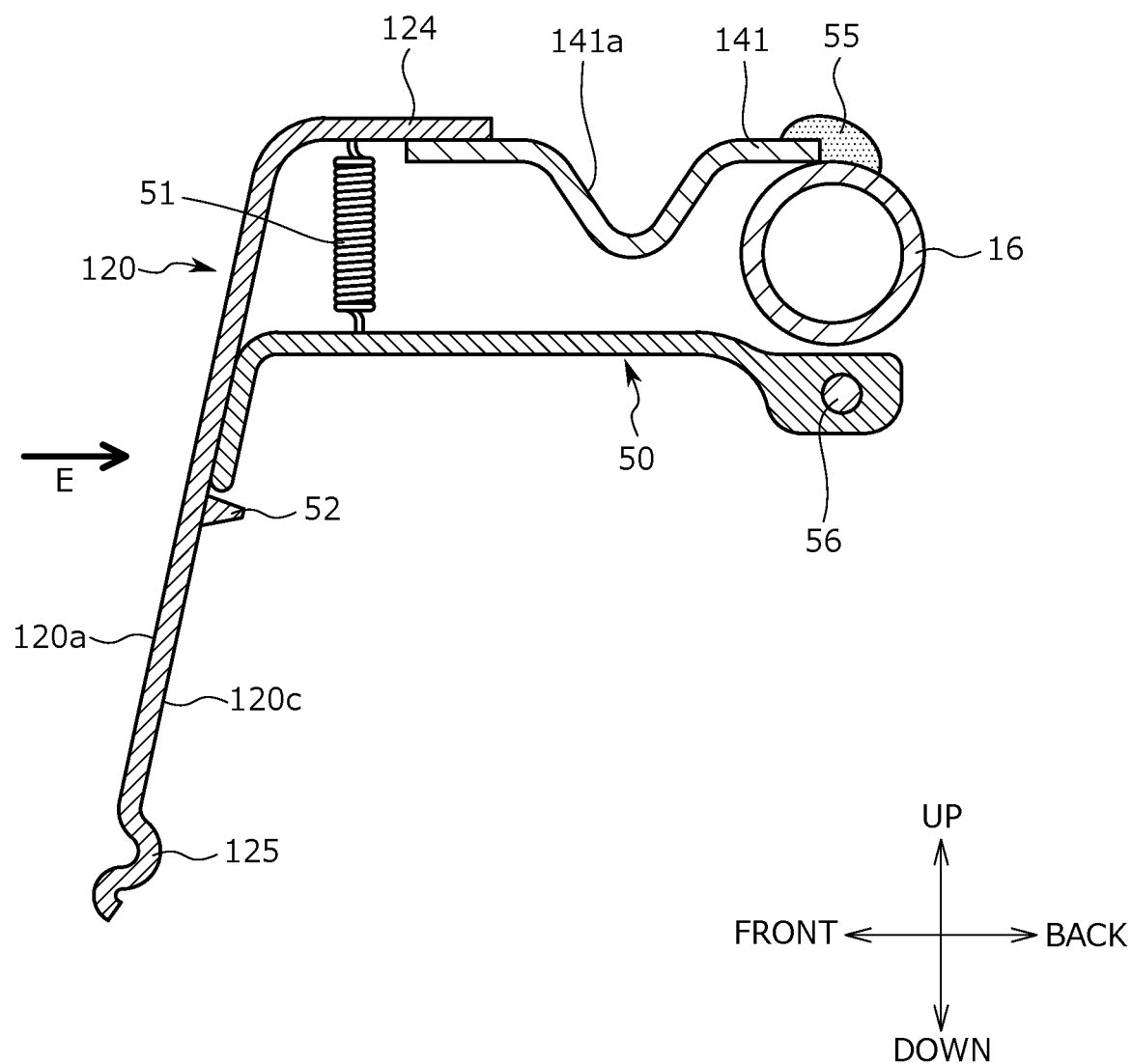
FIG. 10A is a cross-sectional view taken along line X-X in FIG. 9, which illustrates the chest support member and the seat back frame.

As illustrated in FIG. 10A, the upper flange portion 124 of the chest support member 120 and the upper pipe 16 are connected to each other by a first deformable member 141. The first deformable member 141 is a plate spring, and a deformable portion 141a having a V-shaped cross section is formed in the vicinity of a center of the first deformable member 141. The first deformable member 141 is joined to the upper pipe 16 by forming a welding portion 55 on a rear end portion of the first deformable member 141 and the upper pipe 16 and welding the welding portion 55 thereto. A front end portion of the first deformable member 141 is joined to the upper flange portion 124 of the chest support member 120.

As illustrated in FIG. 10A, the chest support member 120 is supported by the first deformable member 141 described above and a lock member 50 extending from the upper pipe 16. The lock member 50 is a member having a cross section formed in an L-shape, and a rear end portion of the lock member 50 is fixed to the upper pipe such that the lock member 50 is turnable by a rotary shaft 56. A front end portion of the lock member 50 is locked to a protrusion 52 provided on a back surface 120c of the chest support member 120 during normal use. In addition, the front end portion of the lock member 50 is connected to the upper flange portion 124 of the chest support member 120 by a spring member 51, and during normal use, the lock member 50 is pulled by the spring member 51. The lock member 50 may be made of metal or resin.

Figure 10B:
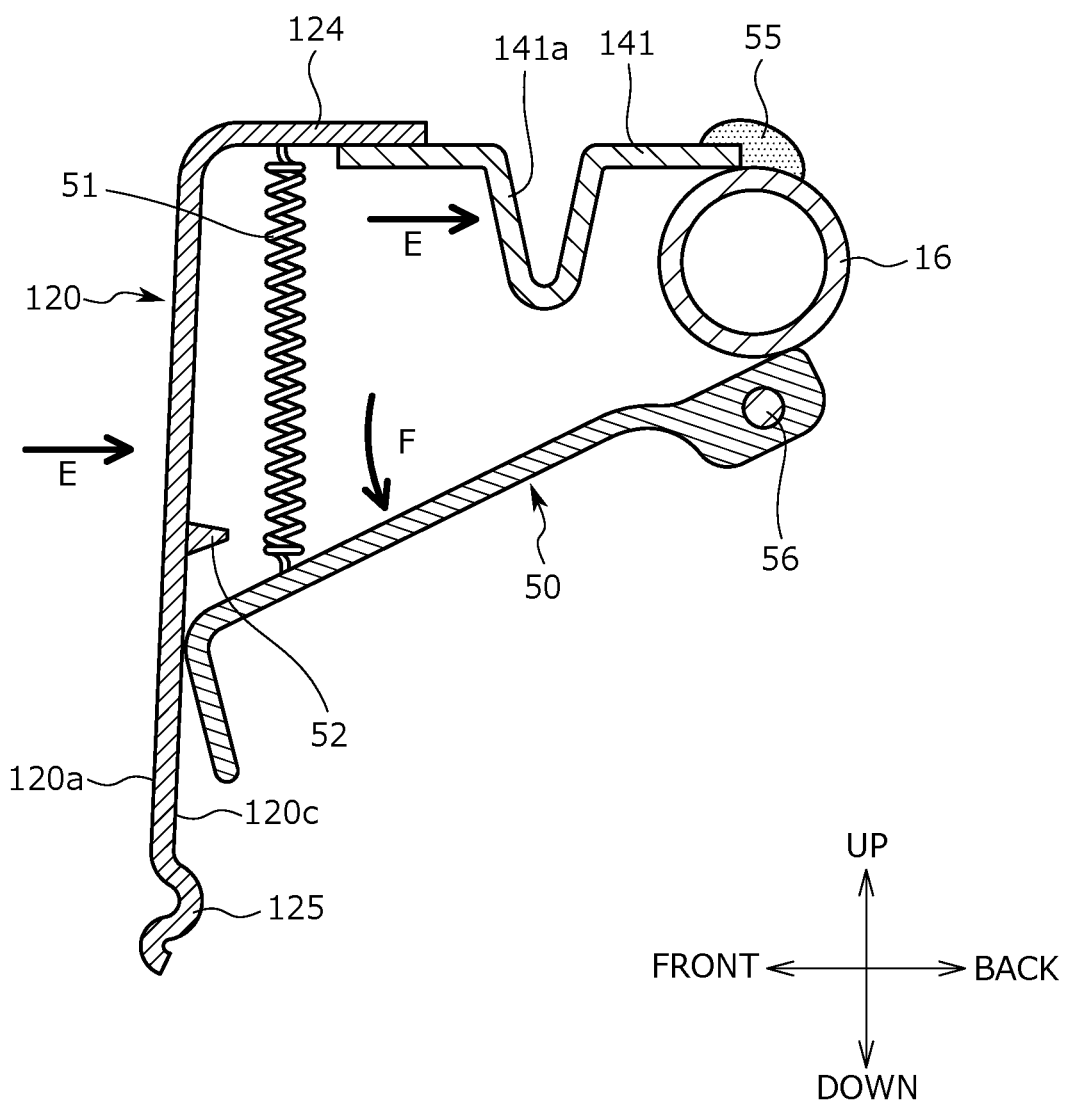
FIG. 10B is a cross-sectional view illustrating a state where the chest support member is deformed because of the application of a load.

Then, as illustrated in FIG. 10B, when a backward movement load is applied in a direction of arrow E at the time of a vehicle collision, the front end portion of the lock member 50 disengages from the protrusion 52, and the lock member 50 turns downward (in a direction of arrow F). When the support of the lock member 50 is removed, the deformable portion 141a having a V-shaped cross section is pressed and crushed to deform the first deformable member 141. The deformable portion 141a is crushed to absorb an impact. At this time, the front end portion of the lock member 50 does not rotate since the front end is connected to the spring member 51 that is extended.

Figure 11:
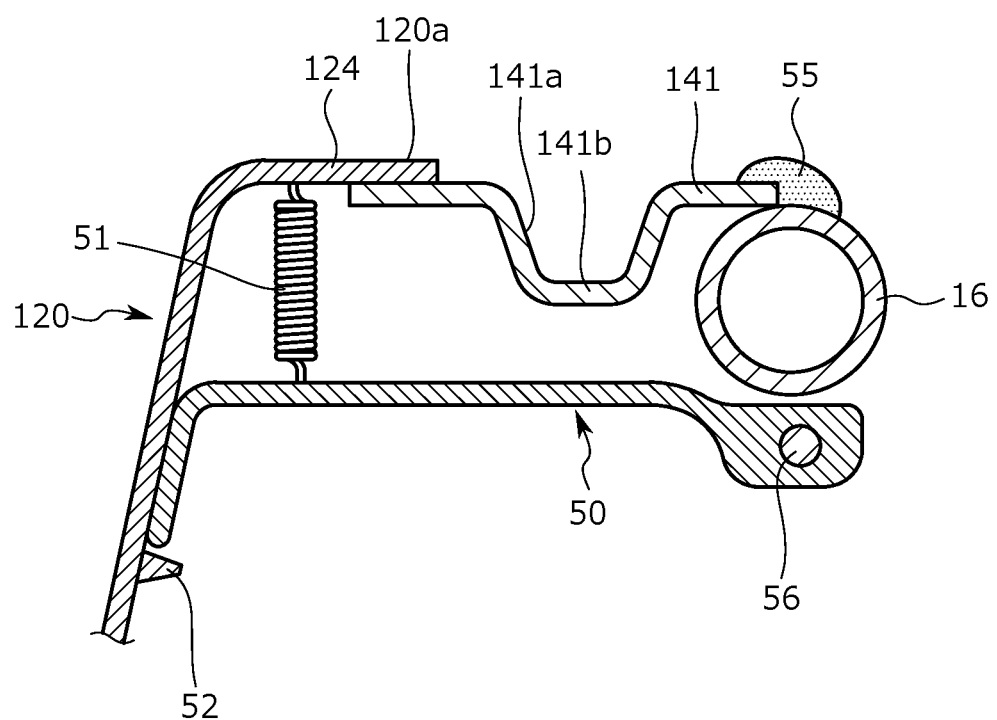
FIG. 11 is a view illustrating another example of a deformable portion.
Figure 11:
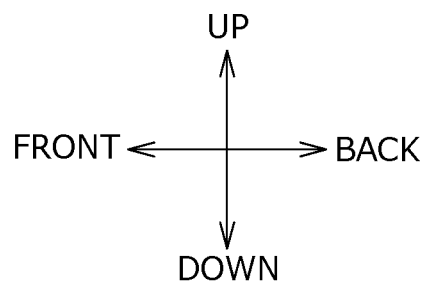

As illustrated in FIG. 11, the deformable portion 141a of the first deformable member 141 may include a linear portion 141b formed flat in the middle of the deformable portion 141a. The amount of deformation when a load is received may be adjusted by forming a hole or cutout in the linear portion 141b.

Figure 12A:
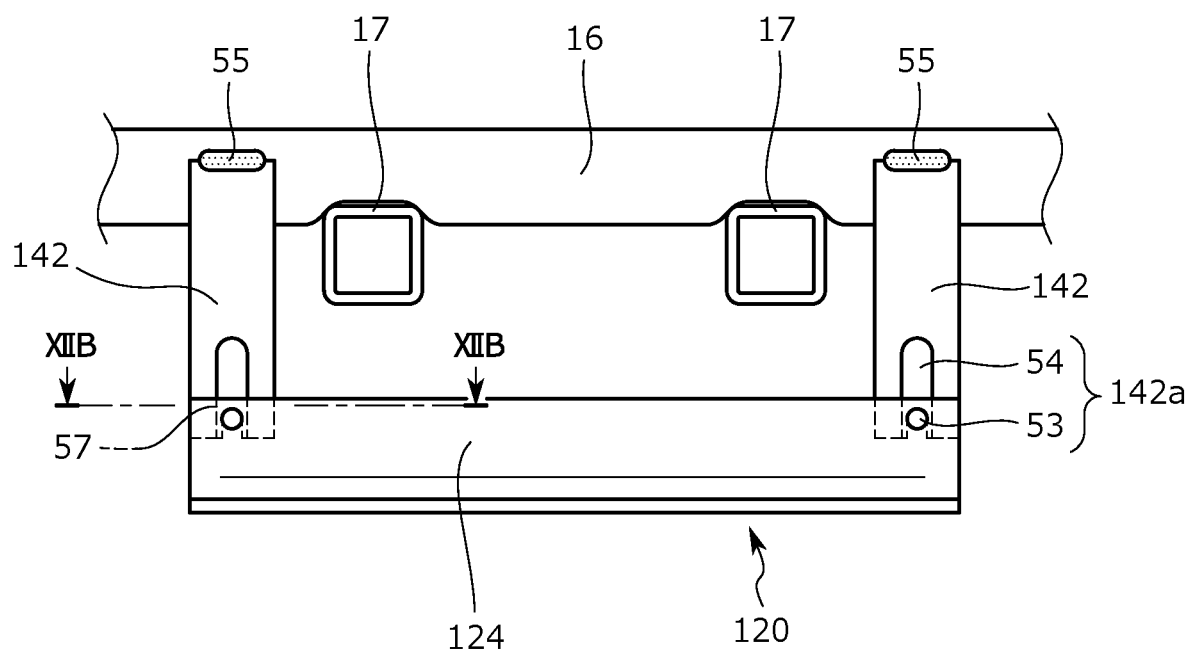
FIG. 12A is a plan view illustrating another example of a support portion that supports the chest support member.
Figure 12A:
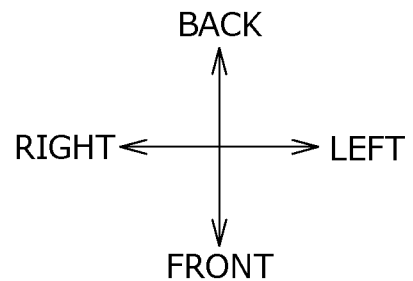
Figure 12B:
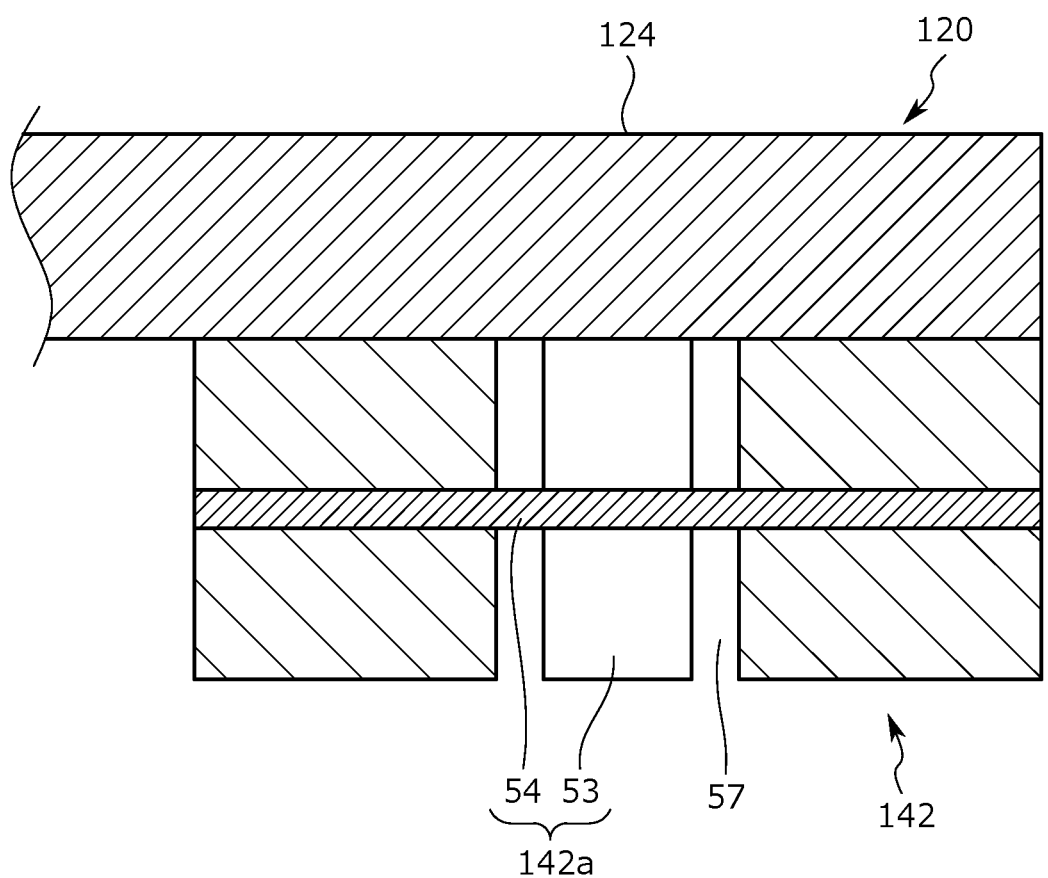
FIG. 12B is a cross-sectional view taken along line XIIB-XIIB in FIG. 12A, which illustrates another example of the support portion that supports the chest support member.

FIGS. 12A and 12B illustrate a first deformable member 142 that is a modification example of the first deformable member 141. Similarly to the first deformable member 141, a rear end portion of the first deformable member 142 is connected to the upper pipe 16 by the welding portion 55. A front end portion of the first deformable member 142 is also connected to the upper flange portion 24 of the chest support member 120. A slit 57 extending backward from a tip of the front end portion is formed, and a fragile portion 54 formed of a thin plate is formed inside the slit 57. The slit 57 and the fragile portion 54 form a deformable portion 142a. The chest support member 120 includes a pin 53 that extends downward from the upper flange portion 124 to penetrate through the fragile portion 54. The pin 53 is slidable inside the slit 57. At the time of a vehicle collision, when a backward movement load is applied, the pin 53 slides to crush the fragile portion 54, thereby absorbing an impact.

In the example illustrated in FIG. 8, the second deformable member 144 of the chest support member 120 is connected to the side frame 15 of the seat back frame 1; however, this configuration is one example, and the second deformable member 144 may be connected to the upper pipe 16 of the seat back frame 1.

Figure 13A:
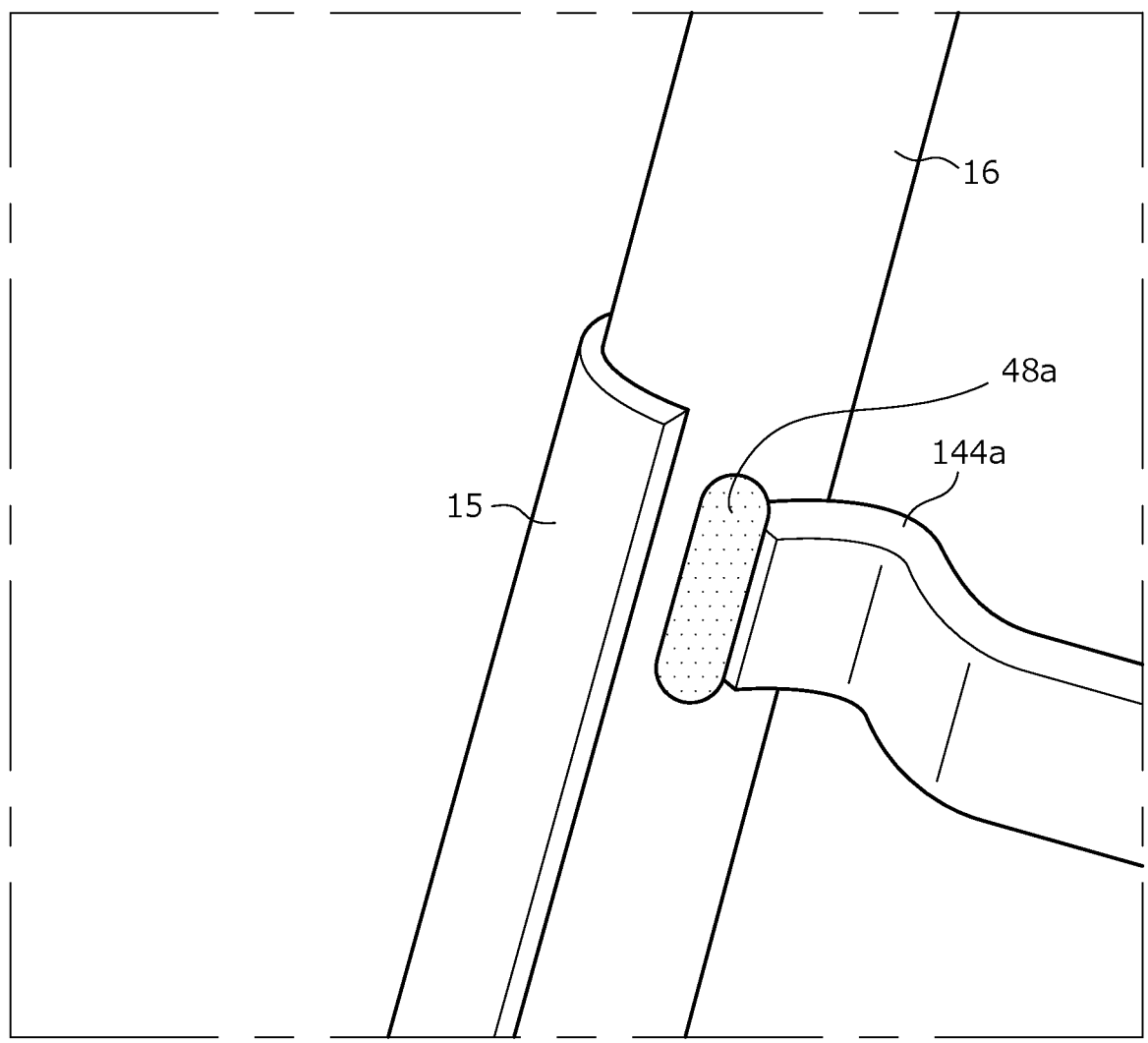
FIG. 13A is a view illustrating a connecting portion between the chest support member and the seat back frame.
Figure 13B:
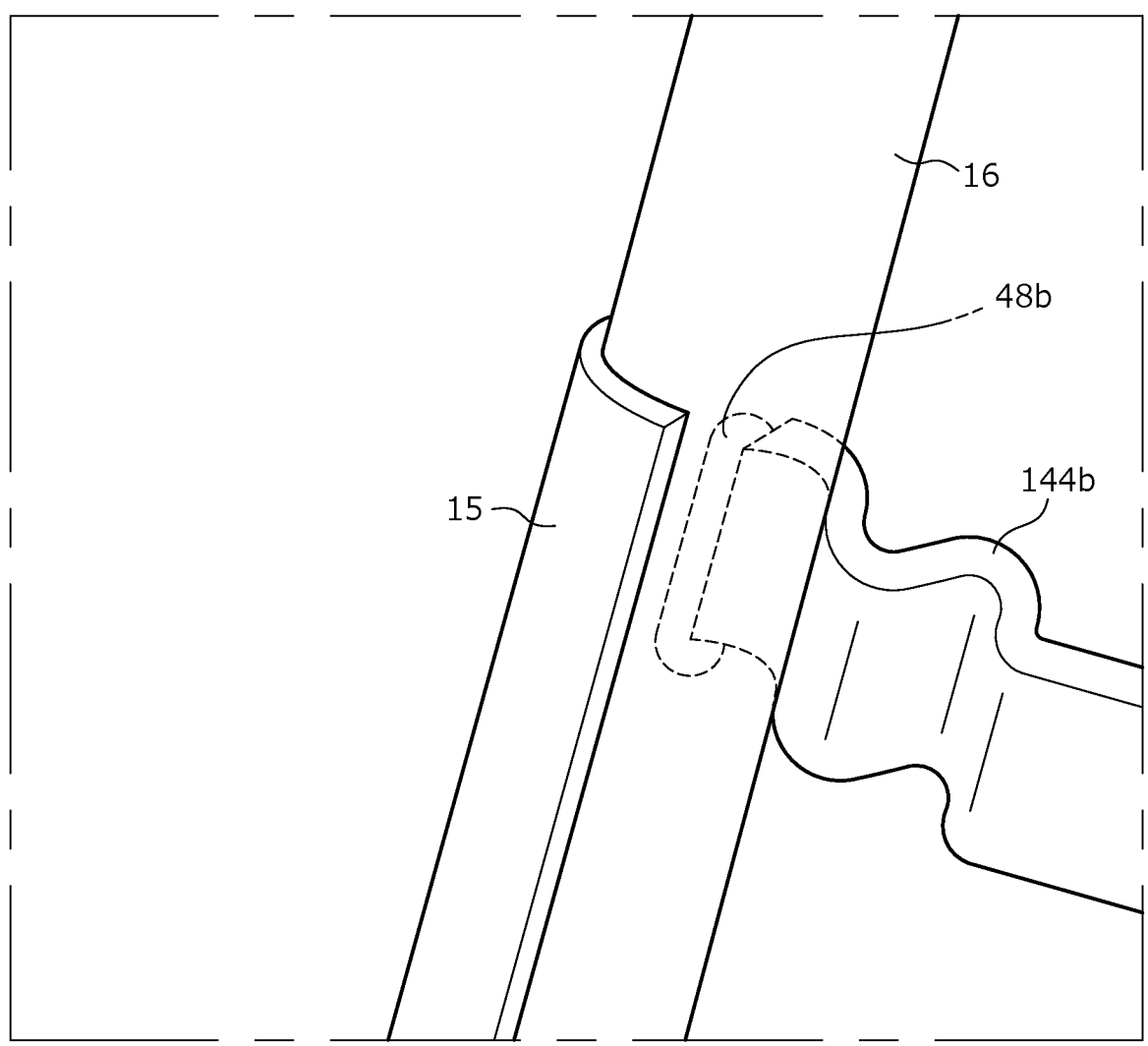
FIG. 13B is a view illustrating another example of the connecting portion between the chest support member and the seat back frame.

For example, as illustrated in FIG. 13A, a second deformable member 144a may be connected to an inner side portion of the upper pipe 16 by a connecting portion 48a. In addition, as illustrated in FIG. 13B, a second deformable member 144b may be connected to a rear portion of the upper pipe 16 by a connecting portion 48b. The connecting portions 48a and 48b are fragile portions (second fragile portions), and are realized by welding or bonding using an adhesive. Since the chest support member 120 is connected to the seat back frame 1 by the fragile portion, the chest support member 120 is disengageable from the seat back frame 1 depending on the magnitude of a backward movement load applied to the occupant.

Namely, even when the second deformable member 144a or 144b is deformed, in a case where the backward movement load cannot be sufficiently reduced, the connecting portion 48a or 48b disengages to reduce an impact. The application of a reaction force from the chest support member 120 to the occupant H is suppressed because of disengagement, and the chest of the occupant H can be protected.

In addition, when a hole, a cut, or the like is formed in the second deformable member 144a or 144b to provide a fragile portion (first fragile portion), and a backward movement load is applied, the fragile portion may break to cause the chest support member 120 to disengage from the seat back frame 1.

The second deformable member 144 and a rear side of the side frame 15 may be connected to each other by a connecting portion 48.

Figure 14A:
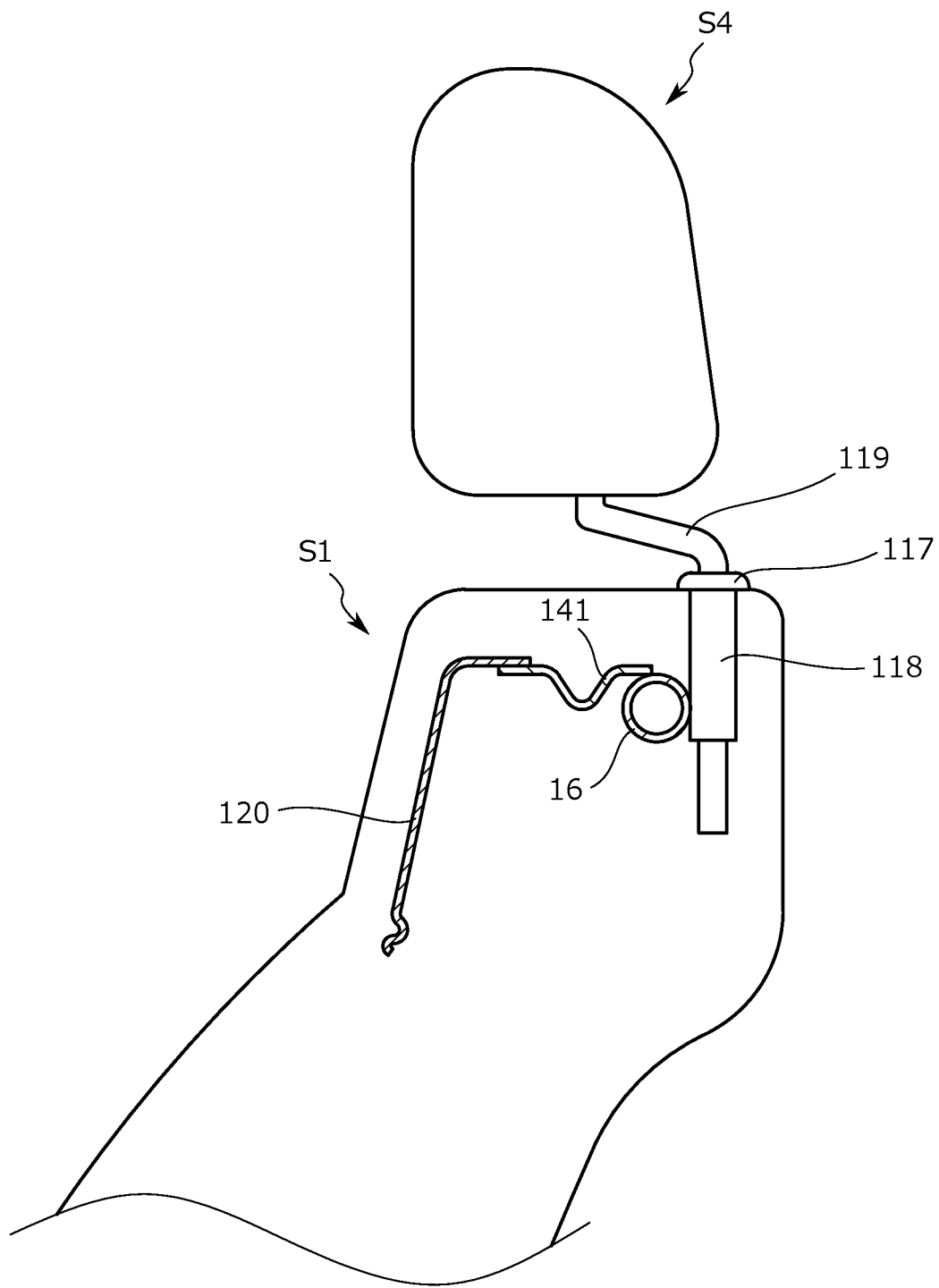
FIG. 14A is a view illustrating a headrest that is attached to the seat back frame so as to be rotatable backward, and illustrating a state where the headrest stands erect (use state).
Figure 14B:
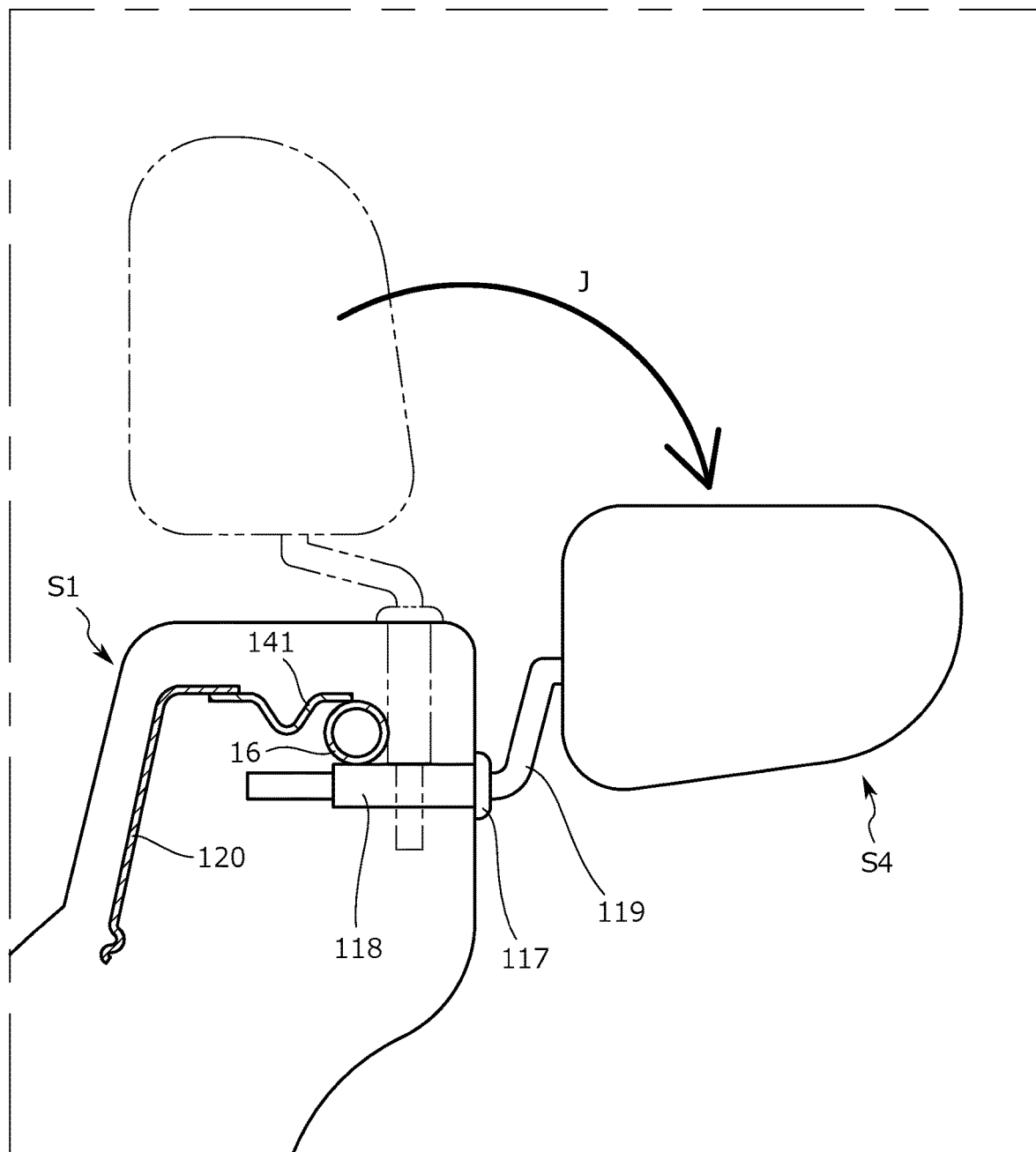
FIG. 14B is a view illustrating the headrest that is attached to the seat back frame so as to be rotatable backward, and illustrating a state where the headrest is turned and laid down (stored state).

FIGS. 14A and 14B illustrate an example of a headrest S4 attached to the seat back frame 1 so as to be rotatable backward.

The headrest S4 is supported by a headrest pillar 119. The headrest pillar 119 is held by a headrest guide 117. A headrest guide stay 118 is attached to the upper pipe 16 of the seat back frame 1 so as to be rotatable backward (in a direction of arrow J in FIG. 14B). The headrest guide stay 118 holds the headrest guide 117 and the headrest pillar 119, and when the headrest guide stay 118 rotates backward, the headrest guide 117 and the headrest pillar 119 rotate backward. When the headrest pillar 119 rotates backward, the headrest S4 also rotates, and as illustrated in FIG. 14B, the headrest S4 is stored backward. Hereinafter, a state of the headrest S4 illustrated in FIG. 14A is called a first state (use state), and a state of the headrest S4 illustrated in FIG. 14B is called a second state (stored state).

Incidentally, the headrest guide stay 118 is made of metal, and the headrest guide 117 is made of resin. The headrest pillar 119 is provided with a plurality of cutouts for the adjustment of height, and a claw portion provided in the headrest guide 117 engages with the cutout to lock the position of the headrest pillar 119.

Since the headrest S4 is rotatably attached, when the headrest S4 is rotated to be in the stored state, for example, during autonomous driving, an occupant seated in a front seat (front seat occupant) and an occupant seated in a rear seat (rear seat occupant) easily talk to each other.

Incidentally, in the examples illustrated in FIGS. 14A and 14B, the headrest S4 that is rotatable backward is illustrated; however, this configuration is one example, and for example, the headrest S4 may be provided to be movable in the up to down direction by providing the seat back frame 1 with a general guide member.

In addition, the headrest S4 may be attached to be movable in a horizontal direction or in the up to down direction by providing the seat back frame 1 with a link mechanism in which a plurality of links are combined, and providing the headrest S4 at a tip of the link mechanism.

In addition, a biasing member such as a spring may be used, or an actuator formed of a drive member such as a motor may be used as means for moving the headrest S4. The headrest S4 may be moved by air (fluid bag) using an air pump. In addition, an airbag may be applied.

In any method, when the vehicle is provided with a sensor that detects a collision of the vehicle before the vehicle collides, it is desirable that in order to protect the head of the occupant, when a collision is predicted, the headrest S4 is set to be moved into the use state.

Third Embodiment

A conveyance seat 200 including the seat back frame 1 which is a third embodiment of the present invention will be described with reference to FIGS. 15 to 18. Incidentally, since the seat exterior shape of the conveyance seat 200 is the same as that of the conveyance seat 100 illustrated in FIG. 1, and the structures of the seat back frame 1 and the seat cushion frame 2 of a seat frame 201 are also the same as those of the seat back frame 1 and the seat cushion frame 2 illustrated in FIG. 2, a description thereof will be omitted.

Figure 15:
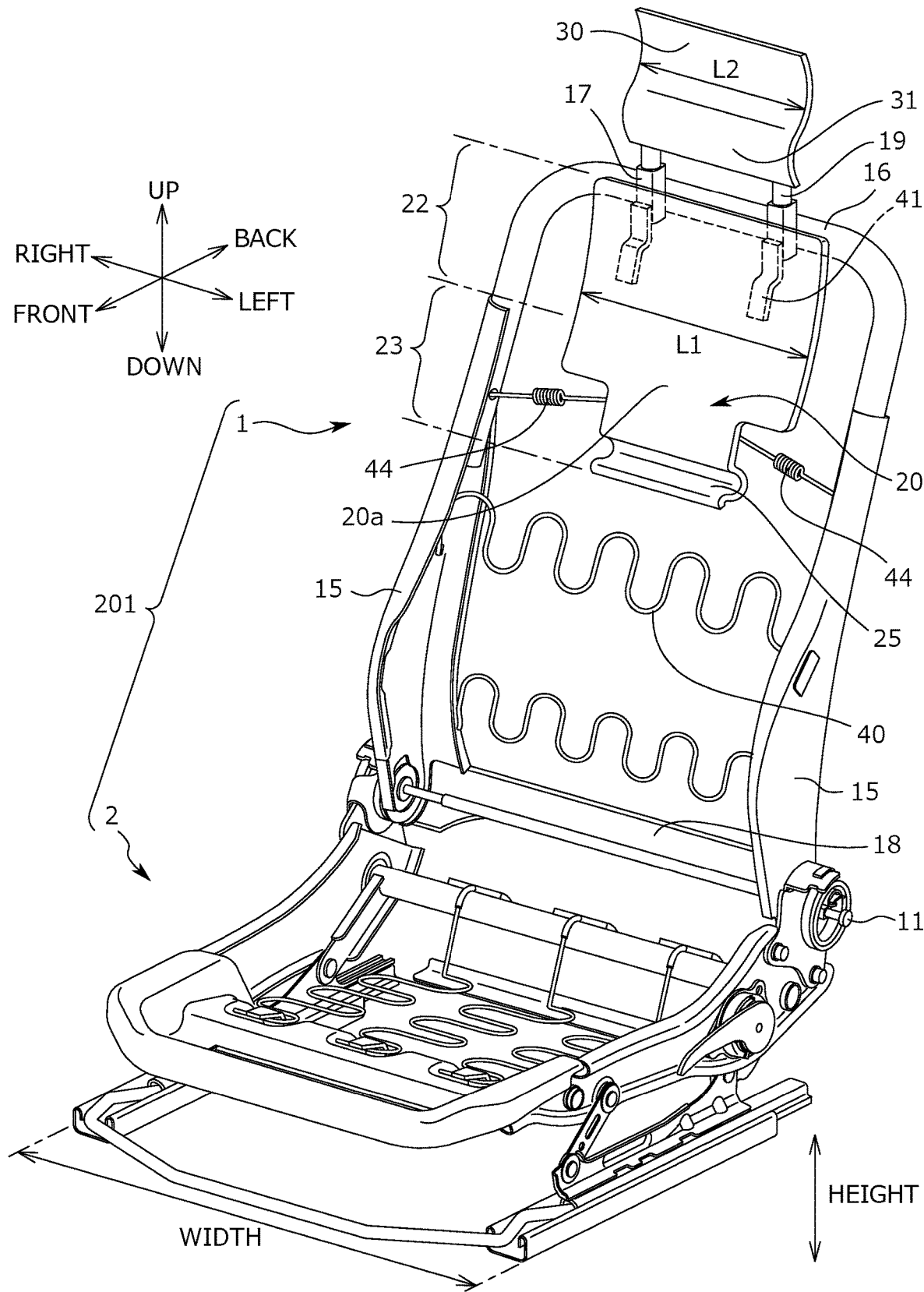
FIG. 15 is a schematic perspective view illustrating a seat frame according to a third embodiment.

The conveyance seat 200 includes a head support member 30 inside the headrest S3. As illustrated in FIG. 15, the head support member 30 is a member having a cross section formed in an S-shape. The head support member 30 of the headrest S3 is provided to receive the head H1 of the occupant H, and to support the head H1 when a backward movement load is applied to the occupant H. The head support member 30 moves the chest H3 and the head H1 of the occupant H in cooperation with the chest support member 20 in a state where the spine shape of the occupant H is maintained.

In order to maintain the spine shape of the occupant H, the headrest S3 is attached to the seat back S1 so as to be turnable around a rotation axis 32. When the headrest S3 supports the head H1 of the occupant H, the headrest S3 supports the head H1 while turning backward (in the direction of arrow C). When the headrest turns, the head support member 30 also turns, and a lower side (neck support portion 31) of the head support member 30 comes into contact with a neck H2 of the occupant to support the neck.

Figure 17:
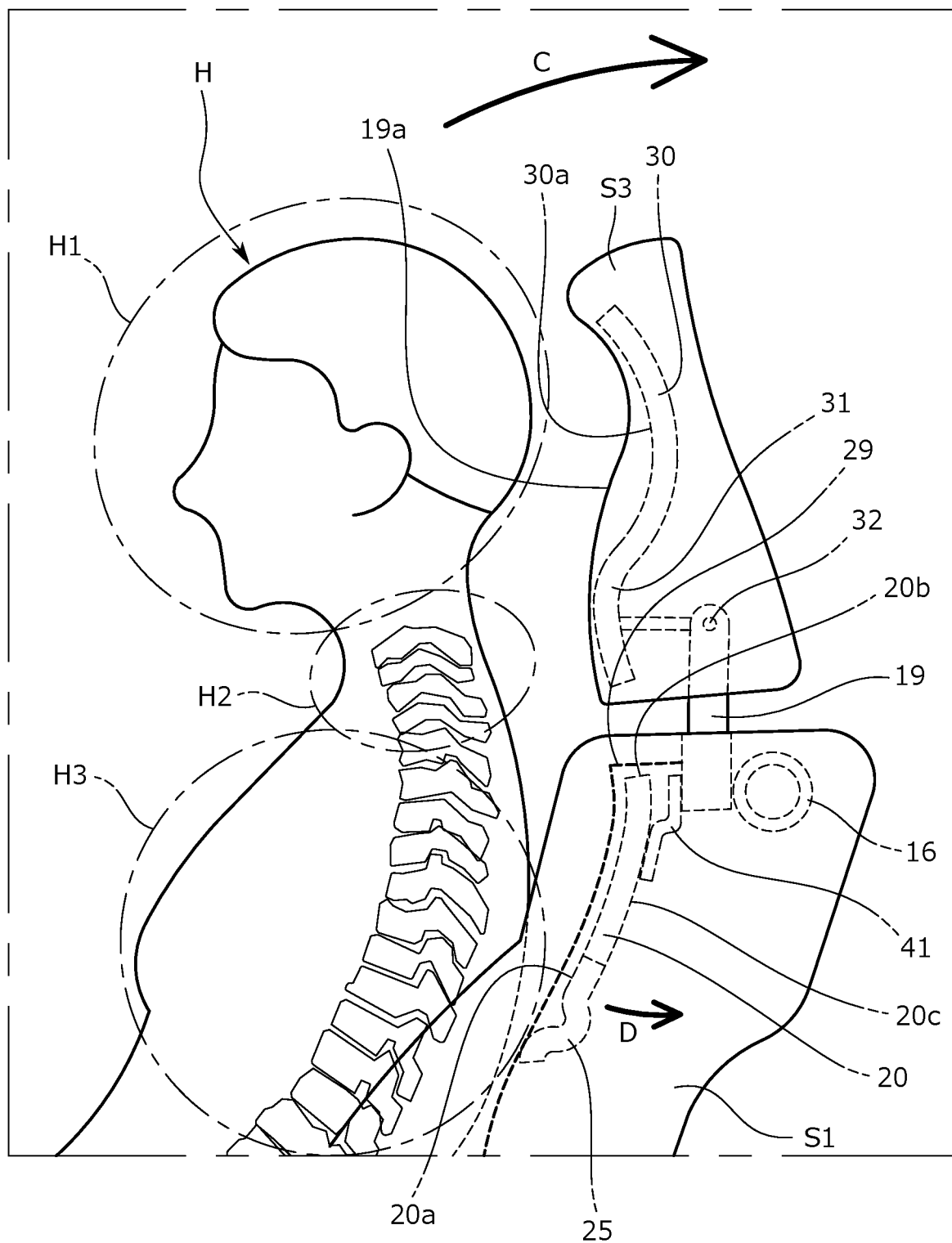
FIG. 17 is a schematic view illustrating a state where a backward movement load is applied to cause the head and the chest of the occupant to come into contact with the conveyance seat.

The chest support member 20 has the chest contact surface 20a that comes into contact with a back side of the chest H3 of the occupant H, and the head support member 30 has a head contact surface 30a that comes into contact with the head H1 of the occupant H. As illustrated in FIG. 17, a lower end of the head contact surface 30a is provided to be located on an extension of the chest contact surface 20a according to the shape of a spine B (a cervical spine B1, a thoracic spine B2, and a lumbar spine B3 (refer to FIG. 3)) of the occupant H when the conveyance seat 200 is seen from the side. Since such disposition is employed, in a state where the spine shape of the occupant H is maintained, namely, in a state where the occupant H is not stooped, the chest support member 20 and the head support member 30 are capable of supporting the spine B of the occupant H, particularly, the cervical spine B1 and the thoracic spine B2.

Figure 16:
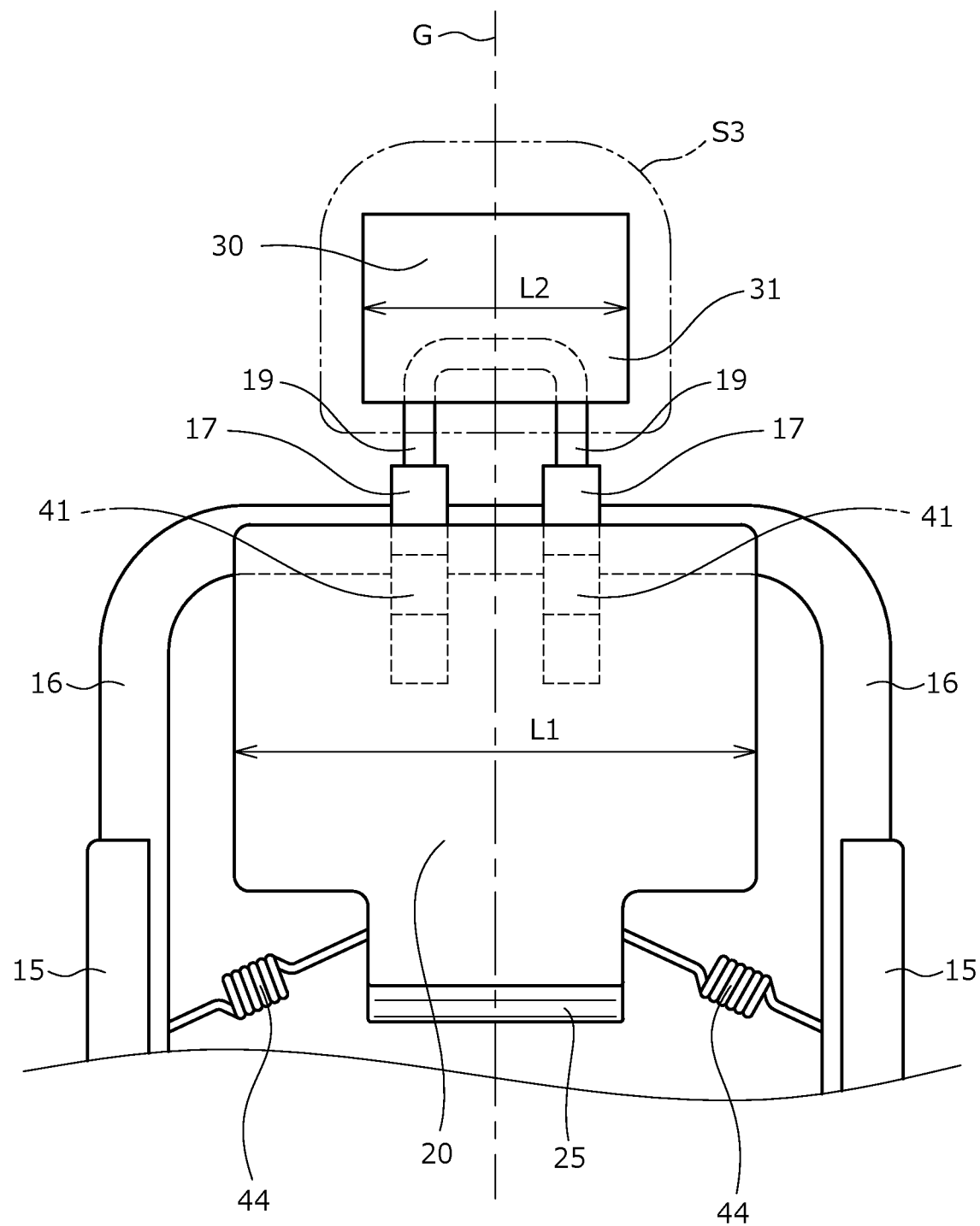
FIG. 16 is a front view illustrating the seat frame according to the third embodiment.

In addition, as illustrated in FIG. 16, the chest support member 20 and the head support member 30 are disposed to align a center of the chest support member 20 in the width direction with a center G of the head support member 30 in the width direction. Since the chest support member 20 and the head support member 30 are disposed to align the centers G thereof with each other, the thoracic spine B2 of the occupant H can be received more reliably and supported in a state where the spine shape is maintained.

In addition, as illustrated in FIG. 16, a length L1 of the chest support member 20 in the width direction is larger than a length L2 of the head support member 30 in the width direction. Since the length L1 of the chest support member 20 in the width direction is lengthened, the chest H3 of the occupant H is received and supported more reliably. Therefore, the sinking amount of the chest H3 is smaller than the sinking amount of the head H1, and the difference between the sinking amount of the chest H3 and the sinking amount of the head H1 is reduced.

Figure 18:
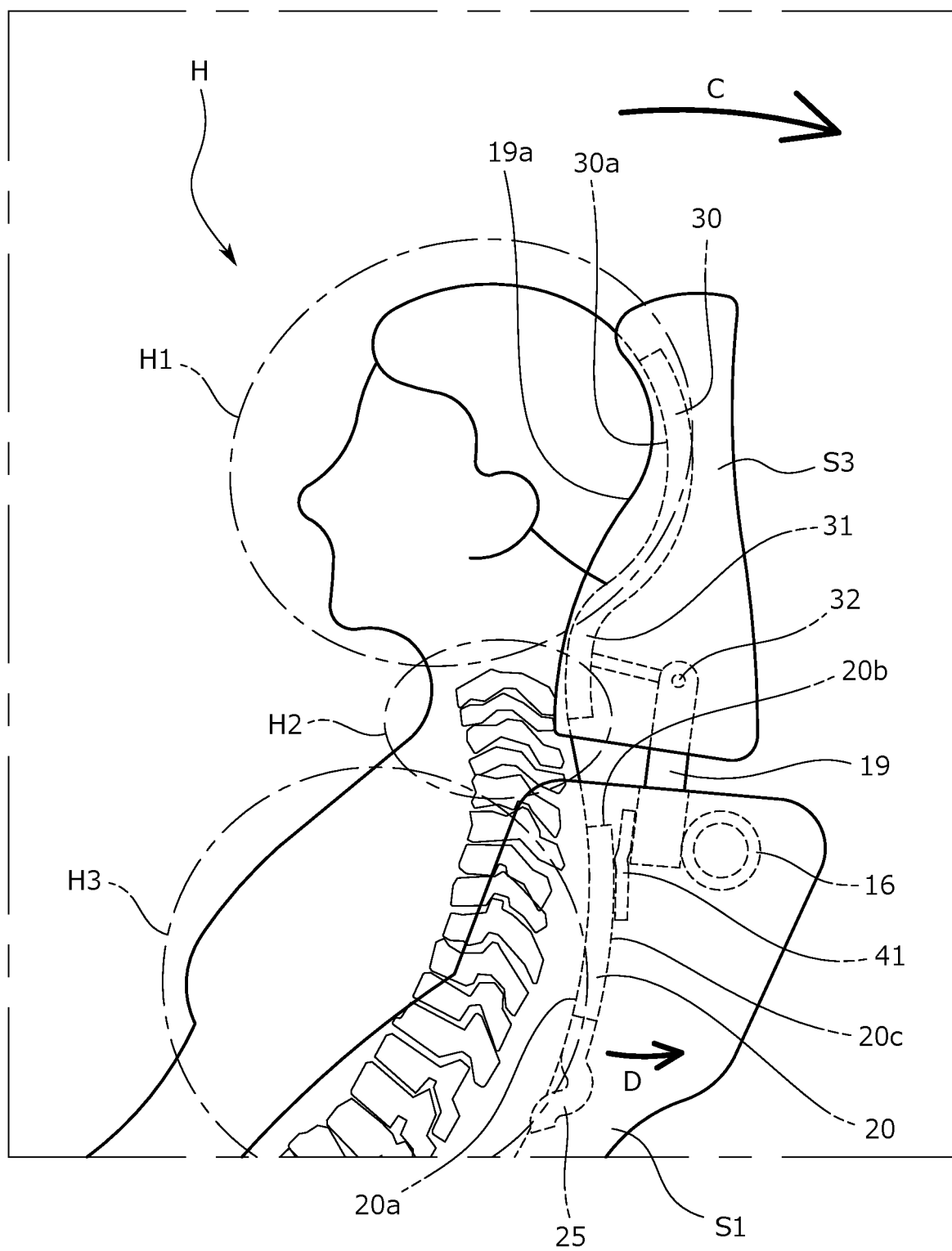
FIG. 18 is a schematic view illustrating a state where the head and the chest of the occupant are moved backward while being supported.

In addition, as illustrated in FIGS. 17 and 18, in the conveyance seat 200 of the present embodiment, when a backward movement load is applied to the occupant H, the movement amount of the chest support member 20 is set to be larger than the movement amount of the head support member 30. Since the movement amount of the chest support member 20 is set large, the sinking amount of the chest H3 can be reduced, and the occupant H is movable backward while the posture of the occupant H is maintained as much as possible.

In other words, the chest support member 20 and the head support member 30 are provided in the seat back S1 and the headrest S3, respectively, such that the chest support member 20 moves backward first and the head support member 30 turns backward next when a backward movement load is applied to the occupant H. As illustrated in FIG. 18, the chest support member 20 and the head support member 30 may be provided in the seat back and the headrest, respectively, such that the head support member 300 turns backward while the chest support member 20 moves backward, and thus both the chest support member 20 and the head support member 30 receive the backward movement load.

In addition, as illustrated in FIGS. 17 and 18, in the head support member 30 of the conveyance seat 200 of the present embodiment, a portion facing the head H1 of the occupant H is formed in a recessed shape to be recessed backward, and a portion facing the neck H2 of the occupant H is formed in a protruding shape to protrude forward. Accordingly, the head H1 and the neck H2 of the occupant H are stably supported.

The embodiments of the present invention have been described above with reference to the drawings. In the above embodiments, the conveyance seats to be mounted in the vehicle have been described as a specific example; however, the conveyance seats are not limited to being mounted in the vehicle, and the conveyance seats of this application can also be provided as seats for trains, buses, or the like, and can also be used as seats for airplanes or ships.

REFERENCE SIGNS LIST 1, 3: seat back frame
  1a, 2a, 3a: pad
  1b, 2b, 3b: skin material
2: seat cushion frame
11: reclining shaft
15: side frame
16: upper pipe
17, 117: headrest guide
18: lower frame bridging portion
118: headrest guide stay
19, 119: headrest pillar
  19a: front surface
20, 120: chest support member
  20a: chest contact surface
  20b: upper end
  20c, 120c: back surface
22: upper portion
23: lower portion
124: upper flange portion
25, 125: lower flange portion
29: storage portion (chest support member-storage portion)
30: head support member
  30a: head contact surface
31: neck support portion
32: rotation axis
40: pressure receiving portion
41, 42, 43, 141, 142: first deformable member
  41a, 41b: bent portion
  141a, 142a: deformable portion (first fragile portion)
  141b: linear portion
44, 45, 46, 47, 144: second deformable member
48, 48a, 48b: connecting portion (second fragile portion)
50: lock member
51: spring member
52: protrusion
53: pin
54: fragile portion
55: welding portion
56: rotary shaft
57: slit
100, 110, 200: conveyance seat
S1: seat back
S2: seat cushion
S3, S4: headrest
101, 102, 201: seat frame
H: occupant (seated occupant)
H1: head
H2: neck
H3: chest
B: spine
B1: cervical spine
B2: thoracic spine
B3: lumbar spine

The invention claimed is:

1. A conveyance seat, comprising:
a seat back,
wherein the seat back includes a seat back frame and a chest support member that is provided in an upper portion of the seat back frame, the chest support member receiving a chest of an occupant to reduce a backward movement load while moving backward with respect to the seat back frame and supporting the chest of the occupant when the backward movement load is applied to the occupant because of a vehicle collision, and
the chest support member is provided at a position to overlap the upper portion of the seat back frame in a height direction,
wherein the chest support member includes a first deformable member provided at an upper end of the chest support member to be connected to the seat back frame, and
wherein the first deformable member consists of a plate spring, and has a bent portion that elastically deforms when the backward movement load is applied to the occupant.

2. The conveyance seat according to claim 1, further comprising:
a headrest provided above the seat back; and
a headrest guide provided at an upper end of the seat back frame to support the headrest,
wherein the first deformable member is connected to the headrest guide,
wherein the chest support member is provided at a position to overlap the headrest guide in the height direction.

3. The conveyance seat according to claim 2,
wherein the chest support member is formed along an extending direction of a front surface of a headrest pillar when seen from a side surface of the conveyance seat.

4. The conveyance seat according to claim 1,
wherein the chest support member is provided at a position to overlap an upper pipe of the seat back frame in the height direction.

5. The conveyance seat according to claim 1,
wherein the seat back includes a pressure receiving portion provided in a side frame of the seat back frame to support the occupant from behind, and
the chest support member is provided to be located above the pressure receiving portion.

6. The conveyance seat according to claim 1,
wherein the chest support member is connected and fixed to a side portion of the seat back frame via a second deformable member.

7. The conveyance seat according to claim 1, further comprising:
a headrest,
wherein the headrest includes a head support member inside the headrest, which receives a head of the occupant to turn backward and to support the head of the occupant when the backward movement load is applied to the occupant, and
when the backward movement load is applied to the occupant, both the chest support member and the head support member receive the backward movement load.

8. The conveyance seat according to claim 7,
wherein the chest support member and the head support member are provided in the seat back and the headrest, respectively, such that the chest support member moves backward first and the head support member turns backward next when the backward movement load is applied to the occupant.

9. The conveyance seat according to claim 7,
wherein the head support member includes a neck support portion that receives a neck of the occupant to support the neck of the occupant when the backward movement load is applied to the occupant.

10. The conveyance seat according to claim 7,
wherein, in the head support member, a portion facing the head of the occupant is formed in a recessed shape to be recessed backward, and a portion facing a neck of the occupant is formed in a protruding shape to protrude forward.

11. The conveyance seat according to claim 7,
wherein the chest support member has a chest contact surface that comes into contact with the chest of the occupant,
the head support member has a head contact surface that comes into contact with the head of the occupant, and
a lower end of the head contact surface is located on an extension of the chest contact surface when the conveyance seat is seen from a side.

12. The conveyance seat according to claim 7,
wherein the chest support member and the head support member are disposed to align a center of the chest support member in a width direction with a center of the head support member in the width direction.

13. The conveyance seat according to claim 7,
wherein a length of the chest support member in a width direction is larger than a length of the head support member in the width direction.

14. The conveyance seat according to claim 1,
wherein a storage portion that stores the chest support member is provided in a pad back surface of the seat back.

15. The conveyance seat according to claim 1,
wherein a hole portion or a cutout is formed in the middle of the first deformable member.

* * * * *